(12) United States Patent
Obori

(10) Patent No.: US 7,930,921 B2
(45) Date of Patent: Apr. 26, 2011

(54) IMPACT DETECTOR AND CONTROLLER FOR PSEUDOEXPERIENCE DEVICE

(75) Inventor: Hitoshi Obori, Shiga (JP)

(73) Assignee: SSD Company Limited, Kusatsu-Shi, Shiga (JP)

(*) Notice: Subject to any disclaimer, the term of this patent is extended or adjusted under 35 U.S.C. 154(b) by 199 days.

(21) Appl. No.: 12/295,245

(22) PCT Filed: Mar. 31, 2006

(86) PCT No.: PCT/JP2006/306805
§ 371 (c)(1),
(2), (4) Date: May 18, 2009

(87) PCT Pub. No.: WO2007/116459
PCT Pub. Date: Oct. 18, 2007

(65) Prior Publication Data
US 2009/0241636 A1    Oct. 1, 2009

(51) Int. Cl.
*G01M 7/00* (2006.01)
(52) U.S. Cl. ......................................... 73/12.04; 73/760
(58) Field of Classification Search ....... 73/12.01–12.14
See application file for complete search history.

(56) References Cited

U.S. PATENT DOCUMENTS

| | | | | |
|---|---|---|---|---|
| 5,914,653 A | * | 6/1999 | Takeuchi et al. | 340/436 |
| 6,018,980 A | * | 2/2000 | Kimura et al. | 73/12.04 |
| 7,529,620 B2 | * | 5/2009 | Mattes et al. | 701/301 |
| 2010/0073812 A1 | * | 3/2010 | Shibata | 360/97.02 |

FOREIGN PATENT DOCUMENTS

| | | |
|---|---|---|
| JP | 1-274783 A | 11/1989 |
| JP | 10-214155 A | 8/1998 |
| JP | 3058089 U | 3/1999 |
| JP | 2000-107444 A | 4/2000 |
| JP | 2000-308756 A | 11/2000 |
| JP | 2002-153673 A | 5/2002 |
| JP | 2005-471 A | 1/2005 |

OTHER PUBLICATIONS

English Translation of International Preliminary Report on Patentability Chapter I, Oct. 21, 2008, from International Phase of the instant application.

* cited by examiner

*Primary Examiner* — Max Noori
(74) *Attorney, Agent, or Firm* — Jackson Patent Law Office

(57) ABSTRACT

An impact detector includes a first determination unit operable to determine whether or not an absolute value of an acceleration in a direction of Y axis exceeds 1G, and an impact determination unit operable to output a predetermined impact detection signal which indicates detection of impact in a direction of Z axis in response to an absolute value of an acceleration in a direction of X axis exceeding 1G within a predetermined time period T after the first determination unit determines that the absolute value of the acceleration in the direction of Y axis exceeds 1G.

15 Claims, 21 Drawing Sheets

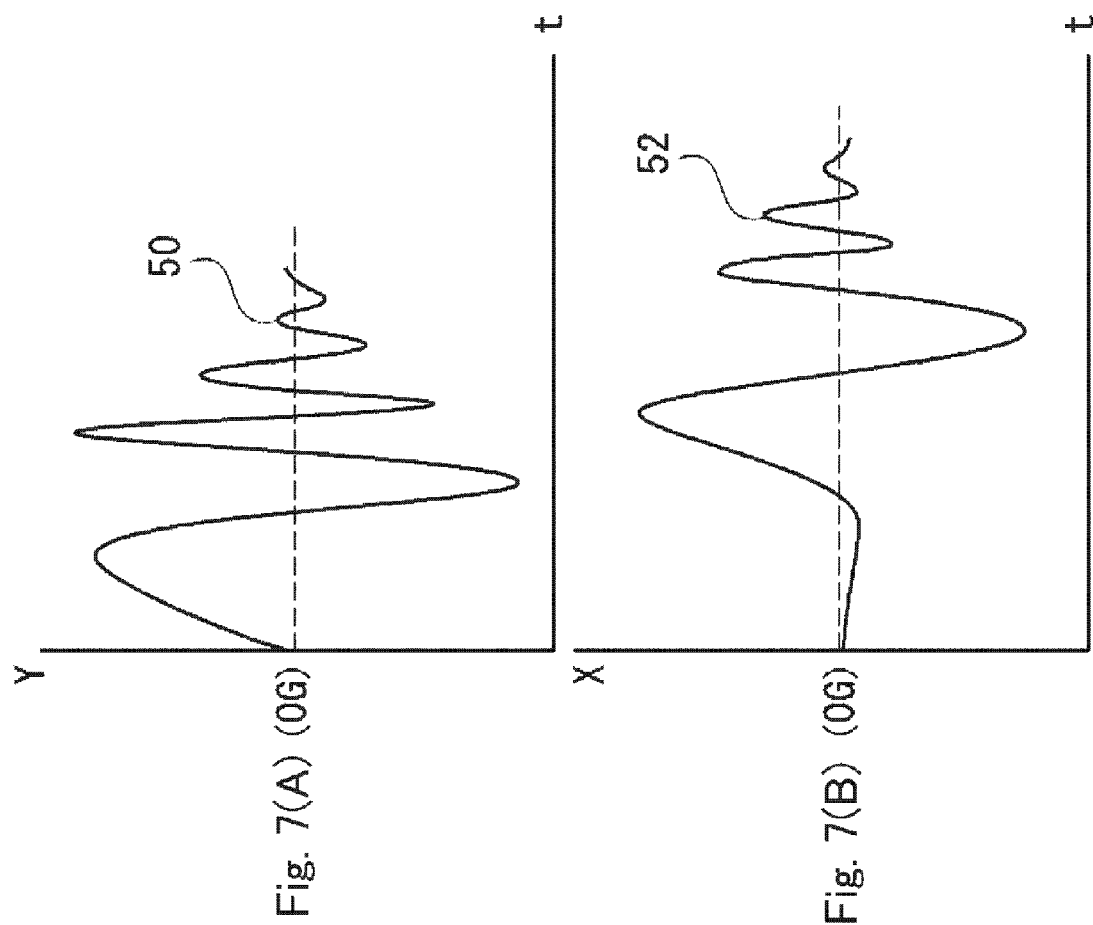
Fig. 7(A) (0G)
Fig. 7(B) (0G)

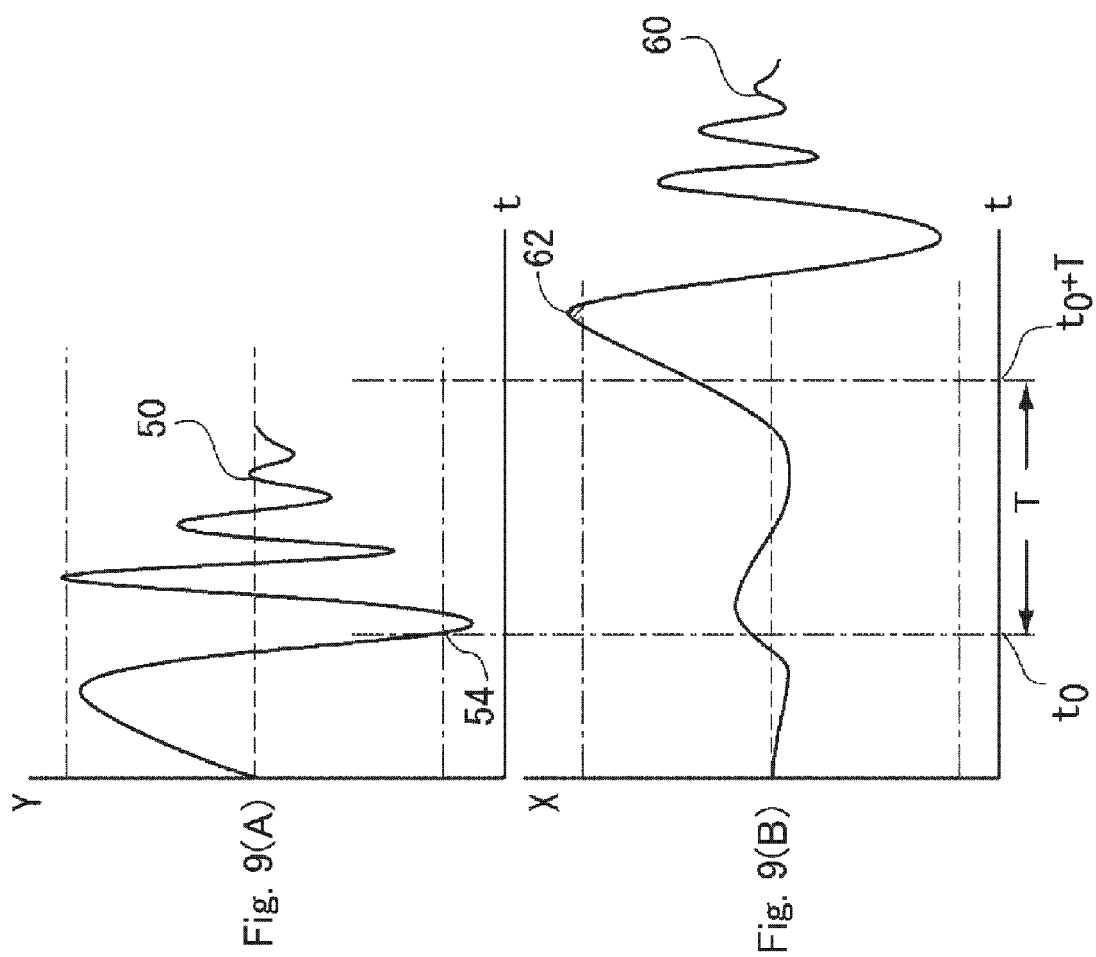

IMPACT DETECTOR AND CONTROLLER FOR PSEUDOEXPERIENCE DEVICE

TECHNICAL FIELD

The present invention relates to a simulated experience apparatus and an impact detector, in particular, for example, to an impact detector capable of detecting impact to an instrument by a simple scheme when a user performs some operation with the instrument and a simulated experience apparatus for providing the user with simulated experience using the impact detector.

BACKGROUND ART

A recent mobile phone often has an acceleration sensor. For example, the Patent Document 1 as described below discloses a mobile phone. The mobile phone determines in what way a user moves the mobile phone spatially based on output of the acceleration sensor (referred to as an acceleration correlation signal in the following description), and operates in accordance with the determination result. For example, if the mobile phone is purposefully swung with a certain frequency, the acceleration correlation signal is generated in accordance with the swing, and then processing to be performed is determined based on the result.

In accordance with the Patent Document 1, the acceleration sensor may be a one-axis acceleration sensor, a two-axis acceleration sensor, or a three-axis acceleration sensor.

Patent Document 1: Japanese Patent Published Application No. 2005-332118

DISCLOSURE OF INVENTION

Problem to be Solved by the Invention

In accordance with the art disclosed by the above Patent Document 1, the movement of the mobile phone is detected based on the acceleration correlation signal. Accordingly, since the two-axis sensor can detect more various movements than the one-axis sensor, the former is more useful than the latter. Since the three-axis sensor can detect more various movements than the two-axis sensor, the former is more useful than the latter.

However, there may be a case where the two-axis sensor is insufficient in the function while the three-axis sensor is excessive in the function depending on an application. For example, there may be a case where it is required to detect relatively precisely axial accelerations of the two-axis sensor while high-precision detection of an acceleration in the direction of other one axis is not required. For example, the case is a case where it is required to detect positions or angles of a device in the directions of two axes while it is required to detect just whether there is any impact in the direction of the other one axis. For example, such device can be used as a controller of an apparatus for providing with simulated experience of a sport and so on with an instrument.

In this case, if it is possible to somehow detect the impact, which corresponds to rapid change of the acceleration in the direction of the third axis, by the two-axis sensor, it is possible to reduce a cost of the controller. However, there is not such art at present.

Also, even if it is possible to realize such detection by the two-axis sensor, there is no value if constitution for detecting is large-scale constitution. It is desired that such detection can be realized by simple constitution.

It is therefore a main object of the present invention to provide an impact detector capable of detecting occurrence of impact in a direction of a third axis with simple constitution using a two-axis acceleration sensor, and a controller with the impact detector for use in a simulated experience apparatus.

Solution of the Problem

In accordance with a first aspect of the present invention, an impact detector, which utilizes a two-axis acceleration sensor operable to detect an acceleration in a direction of a first axis and an acceleration in a direction of a second axis, for detecting impact in a direction of a third axis different from the direction of the first axis and the direction of the second axis, comprising: a first determination unit operable to determine whether or not an absolute value of the acceleration in the direction of the first axis exceeds a predetermined first threshold value which is positive; and an impact determination unit operable to output a predetermined impact detection signal which indicates that the impact in the direction of the third axis is detected in response to an absolute value in the direction of the second axis exceeding a predetermined second threshold value which is positive within a predetermined time period after said first determination unit determines that the absolute value of the acceleration in the direction of the first axis exceeds the first threshold value.

In the case where the absolute value in the direction of the second axis exceeds the second threshold value within the predetermined time period after the absolute value of the acceleration in the direction of the first axis exceeds the first threshold value, the case indicates that the impact in the direction of the third axis has occurred. This point became clear by the experiment. Accordingly, the first determination unit determines that the absolute value of the acceleration in the direction of the first axis exceeds the first threshold value, subsequently if the absolute value in the direction of the second axis exceeds the second threshold value within the predetermined time period, it can be determined that the impact in the direction of the third axis occurs. In this way, it is possible to detect the impact in the direction of the third axis using the two-axis acceleration sensor which detects only the accelerations in the directions of the first and second axes without using the three-axis sensor.

Preferably, said impact determination unit includes: a timing unit operable to start measuring elapsed time in response to determination by said first determination unit that the absolute value of the acceleration in the direction of the first axis exceeds the first threshold value, and stop measuring the elapsed time when the predetermined time period is elapsed; a second determination unit operable to determine whether or not the absolute value of the acceleration in the direction of the second axis exceeds the second threshold value; and an impact detection signal output unit operable to output the impact detection signal in response to determination by said second determination unit that the absolute value of the acceleration in the direction of the second axis exceeds the second threshold value during said timing unit measures the elapsed time.

The timing unit measures the predetermined time period after it is determined that the absolute value of the acceleration in the direction of the first axis exceeds the first threshold value. If the second determination unit determines that the absolute value of the acceleration in the direction of the second axis exceeds the second threshold value by the time the timing unit finishes the measurement, as the result, it can be determined that the impact in the direction of the third axis occurs. By using the determination of the second determination unit with the simple configuration while the timing unit measures the predetermined time period certainly, it is possible to certainly detect the occurrence of the impact using the simple configuration.

More preferably, the impact detector further comprising: a detection time limitation unit operable to limit time for detecting the impact by said first determination unit, said second determination unit and said impact determination unit to a predetermined operation window time.

For example, in the case where an MCU (Micro Controller Unit) and so on is utilized for controlling the impact detector, essentially, the processing by the MCU is sequentially executed. The other processing is often assigned to the MCU, and therefore it is impossible to occupy the MCU for a long time only to detect the impact. Accordingly, the detection time limitation unit limits the above processing for detecting the impact, and whereby it is possible to assign the other processing to the MCU during the remaining time. As the result, it is possible to provide the preferable impact detector for the process of the MCU.

Still more preferably, said impact detection signal output unit includes: a unit operable to output the impact detection signal in response to the determination by said second determination unit that the absolute value of the acceleration in the direction of the second axis exceeds the second threshold value during said timing unit measures the elapsed time within the predetermined operation window time set by said time limitation unit.

When the determination is made during the timing unit measures the elapsed time within the detection time set by the detection time limitation unit, the impact detection signal is output. Since the process is executed within the time period assigned for the processing of detecting the impact, if an MCU is used, it is possible to provide the preferable impact detector for the process of the MCU.

Said impact detection signal output unit may include: a unit operable to output the impact detection signal as a function of the absolute value of the acceleration in the direction of the first axis when the absolute value of the acceleration in the direction of the first axis exceeds the first threshold value, and the absolute value of the acceleration in the direction of the second axis when the absolute value of the acceleration in the direction of the second axis exceeds the second threshold value during the timing unit measures the elapsed time.

The impact detection signal is output as a function of the acceleration in the direction of the first axis and the acceleration in the direction of the second axis. It is believed that the difference between them correlates with the size of the impact. As the result, it is also possible to detect the size of the impact with a certain level of accuracy by the function.

Preferably, said impact detection signal output unit includes: a unit operable to output the impact detection signal as a function of a maximum value of parts exceeding the first threshold value of the accelerations in the direction of the first axis by time the timing unit stops measuring the elapsed time after the absolute value of the acceleration in the direction of the first axis exceeds the first threshold value, and a maximum value of parts exceeding the second threshold value of the accelerations in the direction of the second axis during the timing unit measures the elapsed time.

The impact detection signal is output as a function of the maximum value of the acceleration in the direction of the first axis and the maximum value of the acceleration in the direction of the second axis. It is believed that these values correlate with the size of the impact, especially, have a high correlation with the maximum value of the size of the impact. As the result, it is possible to detect the size of the impact with relatively high accuracy by the function.

Preferably, the impact detector further comprising: a control signal generation unit operable to generate one of a plurality of kinds of predetermined control signals in accordance with combination of a value of the acceleration in the direction of the first axis and a value of the acceleration in the direction of the second axis when the absolute value of the acceleration in the direction of the first axis output from said two-axis acceleration sensor is the first threshold value or less and is a predetermined first lower limit value or more, or when the absolute value of the acceleration in the direction of the second axis output from said two-axis acceleration sensor is the second threshold value or less and is a predetermined second lower limit value or more.

It can not be determined that the impact occurs when the absolute value of the acceleration in the direction of the first axis is the first threshold value or less and the absolute value of the acceleration in the direction of the second axis is the second threshold value or less. However, even if this case, when the absolute values of these accelerations have the predetermined values, it is believed that the combination of the values of these accelerations indicates the direction and the magnitude of the movement of the impact detector. Accordingly, if one of the plurality of kinds of predetermined control signals is generated according to the combination of the values of the accelerations in the directions of the first and second axes, it is possible to determine the direction and the magnitude of the movement of the impact detector based on the value thereof to utilize them for controlling an apparatus. For example, this control signal can be regarded as a signal when an arrow key of an ordinary controller is depressed.

The first threshold value and the second threshold value may be equal to each other. The first lower limit value and the second lower limit value may be also equal to each other.

Symmetry property is expressly not required of the accelerations in the directions of the first and second axes. However, for example, when a person operates the impact detector, the movement thereof has often the symmetry property with respect to the two axes. Accordingly, it is preferable that the first threshold value and the second threshold value, or the first lower limit value and the second lower limit value are equal to each other depending on application.

More preferably, the impact detector further comprising: a unit operable to determine that said impact detector remains stationary when the absolute value of the acceleration in the direction of the first axis output from said two-axis acceleration sensor is less than the first lower limit value and the absolute value of the acceleration in the direction of the second axis output from said two-axis acceleration sensor is less than the second lower limit value.

Even if the impact detector moves in the direction of the first axis or the direction of the second axis, if the accelerations thereof are less than the first and second lower limit values respectively, it is determined that the impact detector remains stationary. In accordance with this configuration, the subtle movement which occurs by necessity when a person holds the impact detector is eliminated. Accordingly, when some control is performed using the direction of the movement of the impact detector, it is possible to eliminate the movement different from the primary intent of the operator to prevent so-called chattering.

Preferably, the impact detector further comprising: a first control signal generation unit operable to generate one of a plurality of kinds of predetermined first control signals in accordance with a value of the acceleration in the direction of the first axis when the absolute value of the acceleration in the direction of the first axis output from said two-axis acceleration sensor is the first threshold value or less and is a predetermined first lower limit value or more, and when the absolute value of the acceleration in the direction of the second axis output from said two-axis acceleration sensor is less than a predetermined second lower limit value; and a second control signal generation unit operable to generate one of a plurality of kinds of predetermined second control signals in accordance with a value of the acceleration in the direction of the second axis when the absolute value of the acceleration in the direction of the second axis output from said two-axis acceleration sensor is the second threshold value or less and is the predetermined second lower limit value or more, and when the absolute value of the acceleration in the direction of the first axis output from said two-axis acceleration sensor is less than the predetermined first lower limit value.

When the absolute value of the acceleration in the direction of the first axis is larger and the absolute value of the acceleration in the direction of the second axis is smaller, it is determined that the impact detector moves along the direction of the first axis. In a similar way, when the absolute value of the acceleration in the direction of the second axis is larger and the absolute value of the acceleration in the direction of the first axis is smaller, it is determined that the impact detector moves along the direction of the second axis. The impact detector outputs the appropriate first control signal and second control signal in accordance with the values of the accelerations in the directions of the first and second axes, and whereby it is determined that the impact detector moves along the direction of the first axis or the second axis with a certain acceleration.

The impact detector further comprising: a third control signal generation unit operable to generate one of a plurality of kinds of predetermined third control signals in accordance with combination of the value of the acceleration in the direction of the first axis and the value of the acceleration in the direction of the second axis when the absolute value of the acceleration in the direction of the first axis output from said two-axis acceleration sensor is the first threshold value or less and is the predetermined first lower limit value or more, and when the absolute value of the acceleration in the direction of the second axis output from said two-axis acceleration sensor is the second threshold value or less and is the predetermined second lower limit value or more.

If the absolute values of the accelerations in the directions of the first and second axes are within the ranges, the fact indicates that the impact detector moves along a direction which intersects with both the first axis and the second axis with a certain level of an acceleration. Also, it is possible to roughly know the direction thereof based on the value of the acceleration in the direction of the first axis and the value of the acceleration in the direction of the second axis. As the result, it is possible to determine the moving direction of the impact detector by generating the third control signal with an appropriate value in accordance with the combination of these values and receiving the third control signal by an external device to check the value.

More preferably, said unit operable to output the impact detection signal includes: an impact size detection unit operable to output an impact size detection signal which indicates any one of a plurality of steps of predetermined impact sizes in accordance with combination of the absolute value of the acceleration in the direction of the first axis when the absolute value of the acceleration in the direction of the first axis exceeds the first threshold value, and the absolute value of the acceleration in the direction of the second axis when the absolute value of the acceleration in the direction of the second axis exceeds the second threshold value during said timing unit measures the elapsed time.

It is believed that the combination of the absolute value of the acceleration in the direction of the first axis when the absolute value of the acceleration in the direction of the first axis exceeds the first threshold value, and the absolute value of the acceleration in the direction of the second axis when the absolute value of the acceleration in the direction of the second axis exceeds the second threshold value represents the size of the impact as the result. Accordingly, if the value of the impact size detection signal is changed in accordance with the combination of them, in a system which receives the output of the impact detector, it is possible to know not only just fact that the impact is applied to the impact detector but also the size thereof.

The impact size detection unit sets the value of the impact size detection signal to a predetermined first value when the value of the acceleration in the direction of the first axis is the third threshold value or more, which is defined as a value between the first threshold value and a predetermined first upper limit value, and further the value of the acceleration in the direction of the second axis is the fourth threshold value or more, which is defined as a value between the second threshold value and a predetermined second upper limit value. The impact size detection unit sets the value of the impact size detection signal to a predetermined second value when the value of the acceleration in the direction of the first axis is the first threshold value or more, and is a fifth threshold value or less, which is defined as a value between the first threshold value and the third threshold value, and further the value of the acceleration in the direction of the second axis is the second threshold value or more, and is a sixth threshold value or less, which is defined as a value between the second threshold value and the fourth threshold value. The impact size detection unit sets the value of the impact size detection signal to a predetermined third value when the value of the acceleration in the direction of the first axis exceeds the fifth threshold value, and is less than the third threshold value, or when the value of the acceleration in the direction of the second axis exceeds the sixth threshold value, and is less than the fourth threshold value.

When the combination of the acceleration in the direction of the first axis and the acceleration in the direction of the second axis is the largest combination, the value of the impact size detection signal is set to the first value. Accordingly, an external system can determine that the largest impact occurs if the value of the impact size detection signal is the first value. When the combination of the acceleration in the direction of the first axis and the acceleration in the direction of the second axis is the smallest combination, the value of the impact size detection signal is set to the second value. Accordingly, the external system can determine that the smallest impact occurs if the value of the impact size detection signal is the second value. Also, in other case, it can be determined that the impact with some intermediate size occurs in accordance with the combination thereof.

The first threshold value and the second threshold value may be equal to each other, the third threshold value and the fourth threshold value may be equal to each other, and the fifth threshold value and the sixth threshold value may be equal to each other.

Symmetry property is expressly not required of the accelerations in the directions of the first and second axes. However, for example, in the case where a person operates the impact detector, when the impact is applied to the impact detector, the movement of the hand of the person has often the symmetry property with respect to the two axes. Accordingly, it is preferable that the first threshold value and the second threshold value, the third threshold value and the fourth threshold value, or the fifth threshold value and the sixth threshold value are equal to each other depending on application.

In accordance with a second aspect of the present invention, a controller of a simulated experience apparatus for enabling a user to have a predetermined simulated experience, comprising: a grip member to be gripped by the user; an impact detector implemented in said grip member and claimed in any one of claims 1 to 13; and a sending unit operable to send output of said impact detector to said simulated experience apparatus.

It is possible to detect the direction of the movement of the impact detector, the impact in the direction of the third axis, the size thereof, and so on by incorporating the above impact detector in the controller of the simulated experience apparatus. As the result, the simulated experience apparatus can be variedly controlled using the two-axis acceleration sensor.

Preferably, said grip member includes a rod-like member, and wherein said impact detector is implemented in said rod member so that the direction of the first axis coincides with a longitudinal axial direction of said rod-like member.

By incorporating the impact detector so that the direction of the first axis coincides with the longitudinal direction of the rod-like member, it is possible to detect the acceleration in the direction of the first axis with accuracy when the rod-like member is swung up and down. Also, it is possible to detect not only the acceleration in the direction of the second axis intersecting with the first axis but also the occurrence of the impact in the direction of the third axis different from both the directions of these axes. As the result, it is possible to give the various control signals to the simulated experience apparatus using the controller including the rod-like member.

BRIEF DESCRIPTION OF DRAWINGS

FIG. 7 is a wave form chart for showing schematically acceleration outputs in an X-axis direction and Y-axis direction of a two-axis acceleration sensor circuit 118 when casting.

FIG. 9 is a wave form chart for showing schematically acceleration outputs in the X-axis direction and Y-axis direction of the two-axis acceleration sensor circuit 118 when the impact is not detected.

Figure 1:
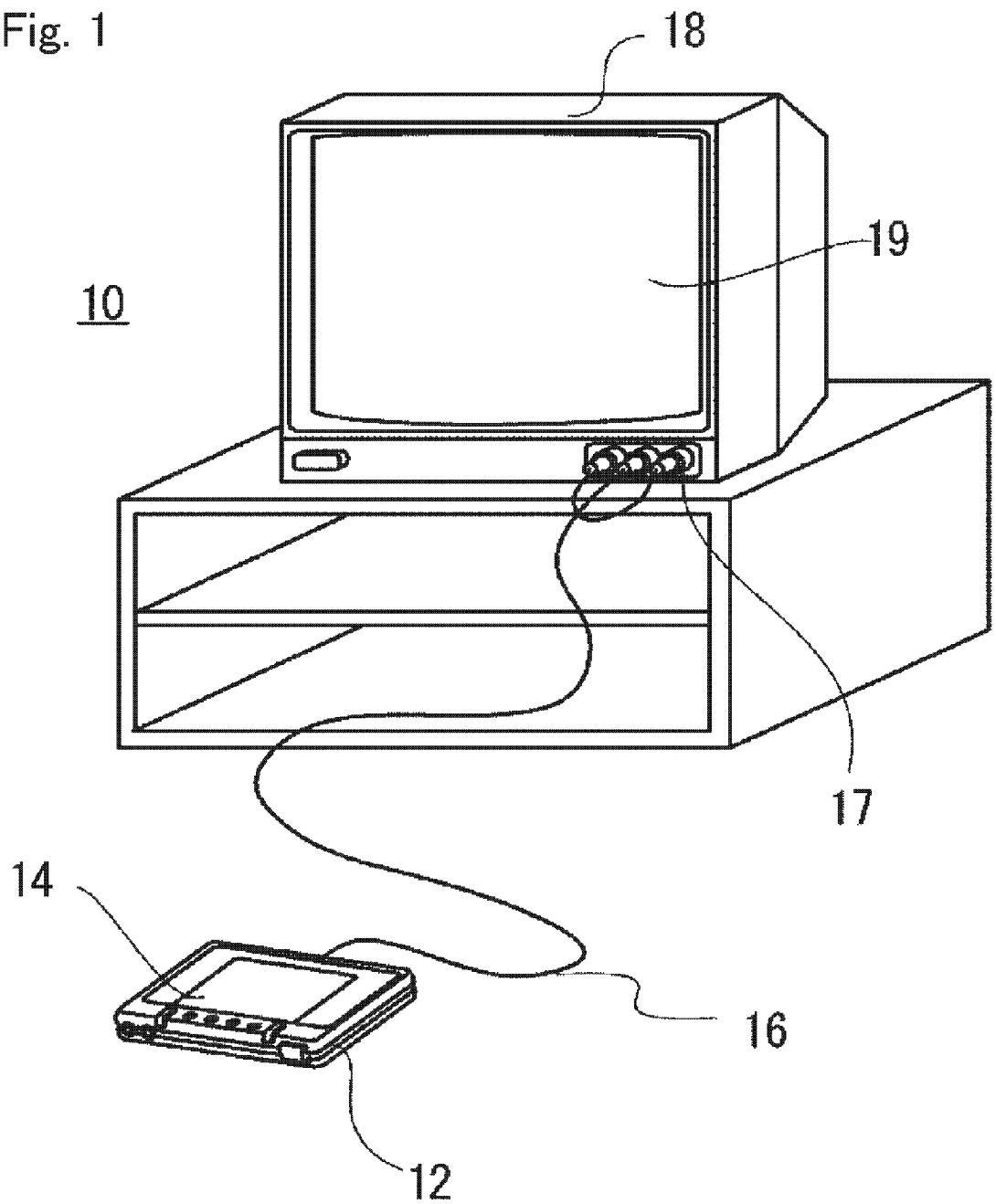
FIG. 1 is a view for showing the overall configuration of a simulated fishing experience system in accordance with one embodiment of the present invention.

EXPLANATION OF REFERENCES 10 simulated fishing experience system
12 adapter
14 cartridge
18 television monitor
20 casting rod
28 switches
100 processor
104 and 110 RF modules
112 MCU
114 driver
116 motor
118 two-axis acceleration sensor circuit
120 rotary encoder

BEST MODE FOR CARRYING OUT THE INVENTION

In what follows, an embodiment of the present invention will be explained in conjunction with the accompanying drawings. Meanwhile, like references indicate the same or functionally similar elements throughout the respective drawings. They also have the same name and function. Therefore, redundant explanation is not repeated.

A simulated fishing experience system in accordance with the present embodiment provides with simulated experience of fishing using a television monitor. Referring to FIG. 1, in the simulated fishing experience system 10 in accordance with the present embodiment, an adapter 12 and a television monitor 18 are used. A cartridge 14 is inserted into the adapter 12. The cartridge 14 implements programs and data for use in the simulated experience of fishing, a processor for executing the programs, and so on. The adapter 12 is essentially just a box. If the cartridge 14 is not inserted, the adapter 12 does not operate at all. However, the adapter 12 is provided with a power supply circuit for supplying a power voltage to the cartridge 14, and further an AV connector (not shown in the figure) at the back. When one plug of the AV cable 16 is plugged to the AV connector and the other plugs of the AV cable 16 are plugged to AV terminals of the television monitor 18, audio video signals generated by the cartridge 14 (AV signals) can be sent to the television monitor 18. Accordingly, pictures representing a situation of fishing are displayed on the screen 19 of the television monitor 18, and music and sound effects are output from a speaker (not shown in the figure).

Figure 2:
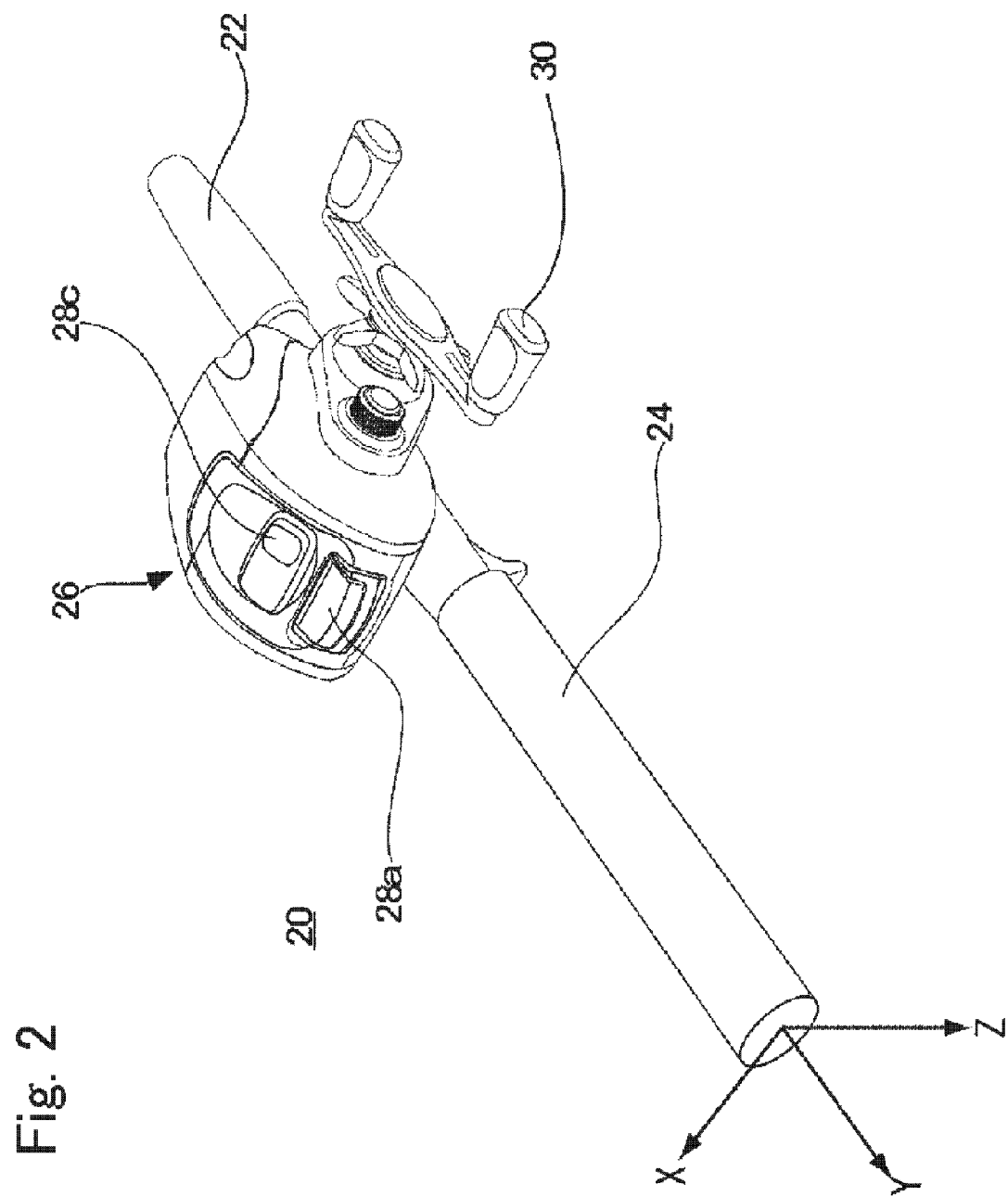
FIG. 2 is a perspective view for showing a casting rod 20 (controller) for use in the simulated fishing experience system of FIG. 1.
Figure 3:
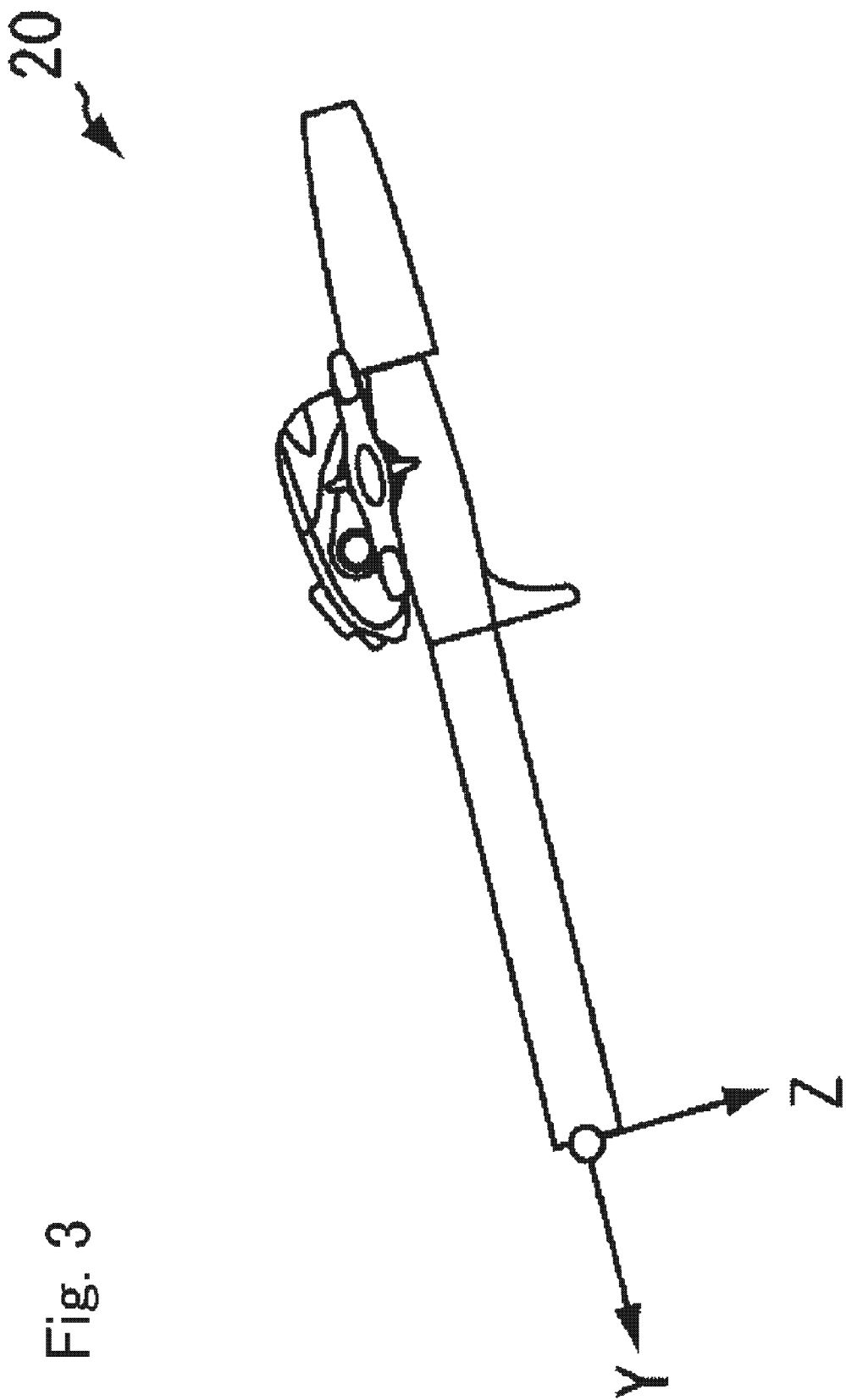
FIG. 3 is a side view for showing the casting rod 20 of FIG. 2.
Figure 4:
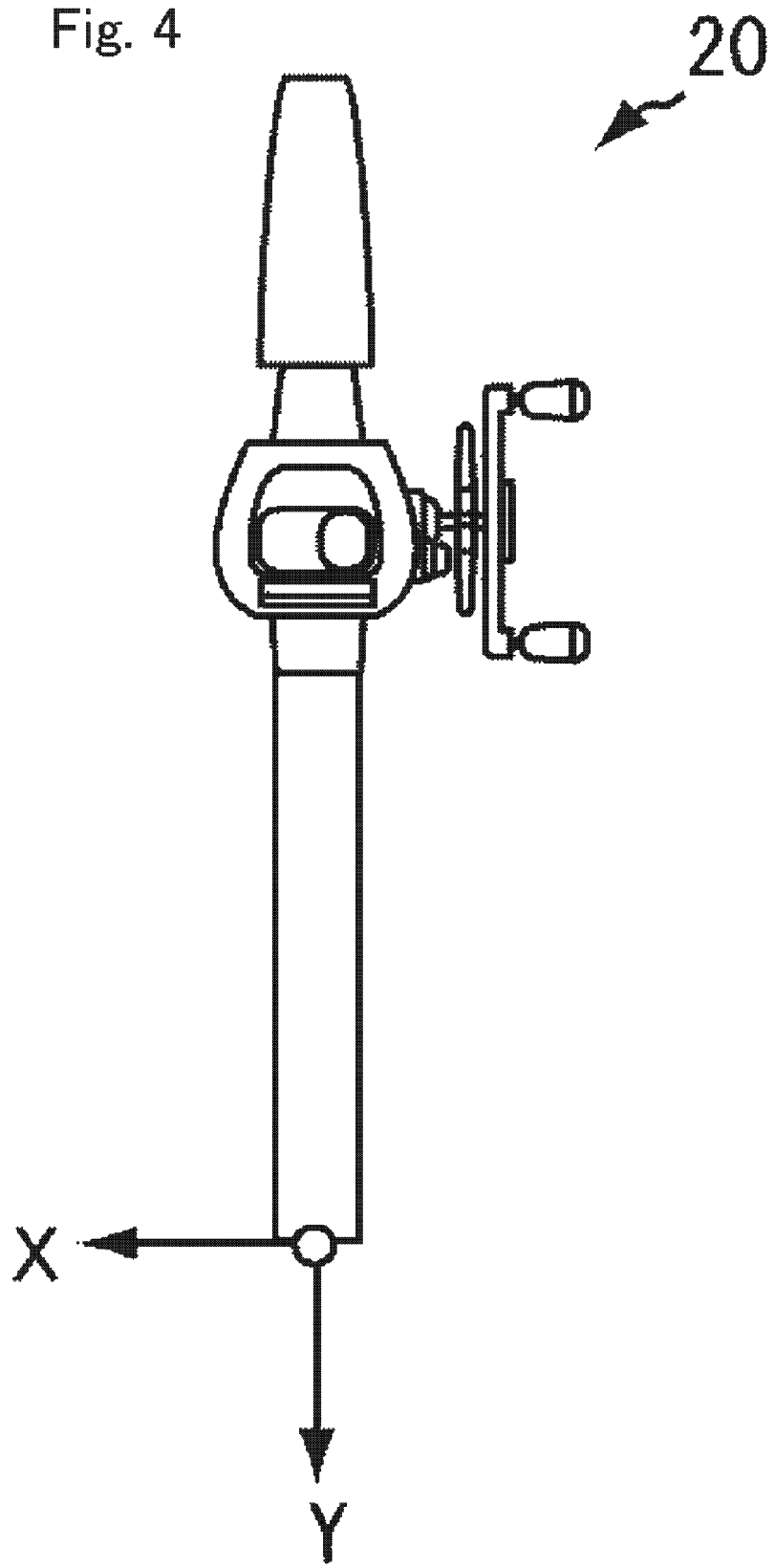
FIG. 4 is a plan view for showing the casting rod 20 of FIG. 2.

In the simulated fishing experience system of FIG. 1, a casting rod 20 shown in the perspective view of FIG. 2, the side view of FIG. 3, and the plan view of FIG. 4 is used. Specifically, referring to FIGS. 2 to 4, as described below, the casting rod 20 and the cartridge 14 inserted into the adapter 12 are connected with each other in a wireless manner in the present embodiment. The both sides may be connected with each other in a wired manner. If a radio wave is used in the wireless manner, since the radio wave is weak, a player (not shown in the figure) operates the casting rod 20 at a position within wireless range between the casting rod 20 and the cartridge 14. However, needless to say, the position is required to be a position where the player can watch the screen of the television monitor 18.

The casting rod 20 has a rod portion 22 which is a rod-like member. The front side of the rod portion 22 is a grip part 24. For example, the player grips the grip part 24 with a hand. A reel housing 26 is fixed in the upper part of the grip part 24 of the rod portion 22. Both the rod portion 22 and the reel housing 26 are made by molding of plastic. Two switches 28a and 28c are provided on the upper surface of the reel housing 26. The switch 28a is a push-button switch which serves as a decision key, and the switch 28c is a cancel key. Incidentally, these switches 28a and 28b may be collectively represented by the reference numeral "28".

A handle 30 is rotatably provided on the right side face of the reel housing 26. The player turns the handle 30 to play the simulated experience of fishing.

A load torque applying mechanism (not shown in the figure) is incorporated in the reel housing 26. A desired load torque can be applied by the load torque applying mechanism when the handle 30 turns, and thereby it is possible to provide with the simulated experience of feeling when fighting a fish and when pulling in a fish.

As described below, the casting rod 20 is provided with the two-axis acceleration sensor circuit inside the reel housing 26 thereof. A method for detecting impact using two acceleration correlation signals output from the two-axis acceleration sensor circuit will be described in what follows. The impact to be detected is impact in the direction of an axis which intersects with two axes of acceleration measurable by the two-axis acceleration sensor circuit.

An XYZ coordinate system will be considered. The XYZ coordinate system is fixed to an acceleration sensor constituting the two-axis acceleration sensor circuit of the reel housing 26. However, in FIGS. 2 to 4, the origin of the XYZ coordinate system is shown at the end of the grip part 24 because of convenience of drawing. The X axis, the Y axis and the Z axis of the coordinate system are assigned to directions shown in FIGS. 2 to 4. That is, the positive direction of the X axis corresponds to the left direction with reference to view of a user. The positive direction of the Y axis corresponds to the front direction which coincides with the axial direction (longitudinal direction) of the rod portion 22. The positive direction of the Z axis corresponds to the perpendicularly downward direction when the user holds the casting rod 20 horizontally. In the present embodiment, the casting rod 20 detects the impact applied in the direction of the Z axis of the casting rod 20 by using the two-axis acceleration sensor which detects the accelerations in the directions of X axis and Y axis instead of a three-axis acceleration sensor. Specifically, the two-axis acceleration sensor having the directions of X axis and Y axis detects the impact in the direction of Z axis which occurs at the timing when the casting rod 20 stops after the swing down for the casting.

Figure 5:
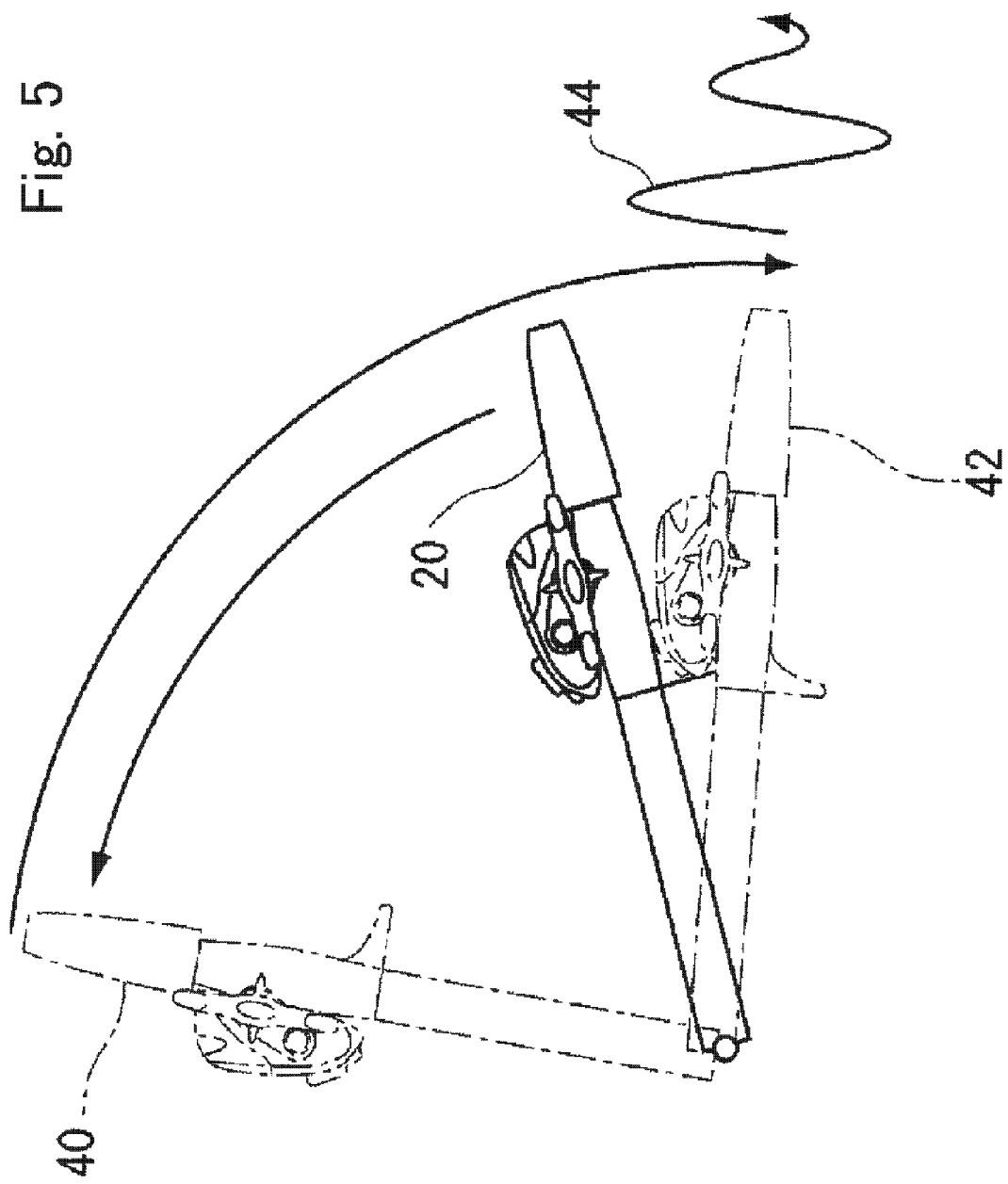
FIG. 5 is a side view for showing the casting rod 20 of FIG. 2 when casting operation is performed.

The principle will be described in what follows. As shown in FIG. 5, when the casting is performed, the casting rod 20 is swung up to the vicinity of the vertical position indicated by the reference numeral "40", and then swung down to the vicinity of the horizontal position indicated by the reference numeral "42" to come to a standstill. In this case, the acceleration in the direction of Y axis of the casting rod 20 is occurred by the centrifugal force during the swing up and down. Incidentally, the Y axis direction component of the gravity acceleration is added to the acceleration in the direction of the Y axis.

However, the casting rod 20 is swung down, then even if the casting rod 20 is tried to be stopped at a desired position, it is generally difficult to stop immediately. Consequently, as shown by the reference numeral "44" of FIG. 5, the tip of the casting rod 20 finely vibrates. Also, there is the case where the acceleration in the direction of the X axis does not occur in theory during the swing up and down. However, since a person moves the casting rod 20, it is impossible not to move the casting rod 20 at all in the direction of X axis. Rather, when the casting rod 20 is swung down and tried to be stopped, the vibration, which causes the sizable acceleration in the direction of the X axis, occurs in the casting rod 20. Such state is shown in FIG. 6.

Figure 6:
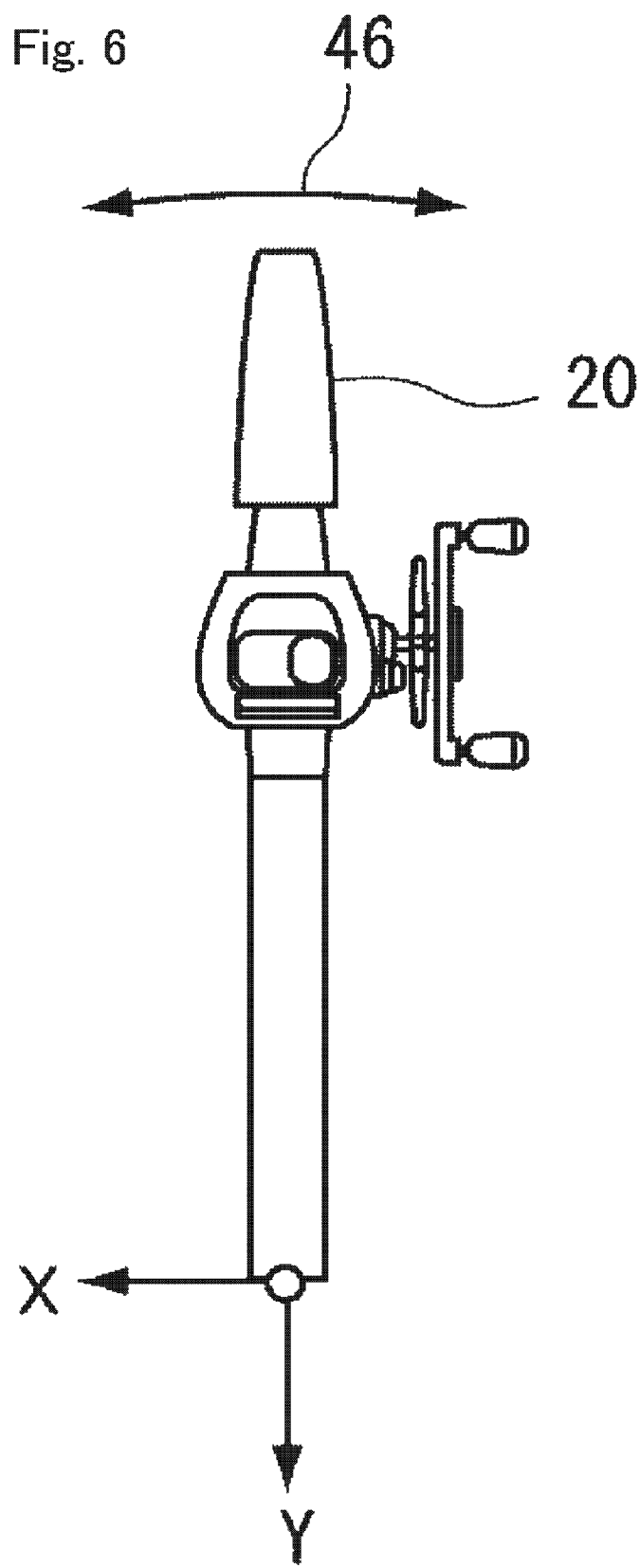
FIG. 6 is a plan view for showing the casting rod 20 of FIG. 2 when casting operation is performed.

Referring to FIG. 6, the casting rod 20 is swung down, then even if the casting rod 20 is tried to be stopped, as shown by the reference numeral "46", the tip of the casting rod 20 vibrates in the direction of X axis with the sizable acceleration. It is believed that the vibration is caused by the movement of an arm of the person.

The accelerations in the directions of X axis and Y axis operated on the casting rod 20 are respectively referred as "X" and "Y". The typical waveforms of the acceleration correlation signals obtained by the two-axis acceleration sensor when casting is performed are shown in FIG. 7(A). In FIG. 7(A), the horizontal axis represents time, and the vertical axis represents magnitude of output of the acceleration sensor in the positive direction of Y axis. In this case, the output of the acceleration sensor is quantized to 256-level (0 to 255). When the output of the acceleration sensor is handled by offset binary, the magnitude of the output corresponding to the gravity "0" (referred to as "0G" in the following description) is "128".

Referring to FIG. 7(A), as described above, when the casting is performed, the casting rod 20 is first swung upward in a vertical direction. When swinging up, while the acceleration based on the centrifugal force occurs in the negative direction of Y axis, the Y axis direction component of the gravity acceleration is also added in the positive direction of the Y axis. The acceleration based on the centrifugal force is zero at the top of the swing up. Accordingly, until this time, the acceleration in the direction of Y axis gradually increases from 0 to 1G.

When swinging down, the acceleration based on the centrifugal force occurs in the negative direction of Y axis, and the gravity acceleration decreases also. Consequently, the acceleration in the positive direction of Y axis decreases. Although the gravity acceleration becomes nearly 0G when the casting rod 20 is tried to be stopped at the position to be stopped, the acceleration based on the centrifugal force does not become 0 immediately and vibrates as shown in FIG. 7(A). However, the absolute value of the maximum value of the acceleration at this time is typically larger than 1G.

The change of the acceleration correlation signal in the direction of X axis is shown in FIG. 7(B). In FIG. 7(B), the horizontal axis represents time, and the vertical axis represents the level of the acceleration correlation signal in the positive direction of X axis. As shown in FIG. 7(B), while the acceleration in the direction of X axis is nearly 0G when the swing up is started, the acceleration in the direction of X axis becomes a large value before and after the casting rod 20 is stopped at the position to be stopped after swinging down. This value also exceeds 1G typically.

When the swing down is performed, particularly, when the casting rod 20 is swung down to the position to be stopped, in this way, both the acceleration in the direction of Y axis and the acceleration in the direction of X axis become the sizable value virtually simultaneously. By the way, the casting rod 20 undergoes the large impact in the direction of Z axis actually when it is swung down to the position to be stopped and tried to be stopped as above. Since the casting rod 20 does not have an acceleration sensor in the direction of Z axis, it is not possible to detect the impact directly. Therefore, in the present embodiment, the occurrence of the impact in the direction of Z axis is detected and then an impact detection signal Z is outputted as follows. As will hereinafter be described in detail, the impact detection signal Z is a two-bit signal which indicates the impact size on a scale of one, two and three (weak, average, and strong).

Figures 8A, 8B:
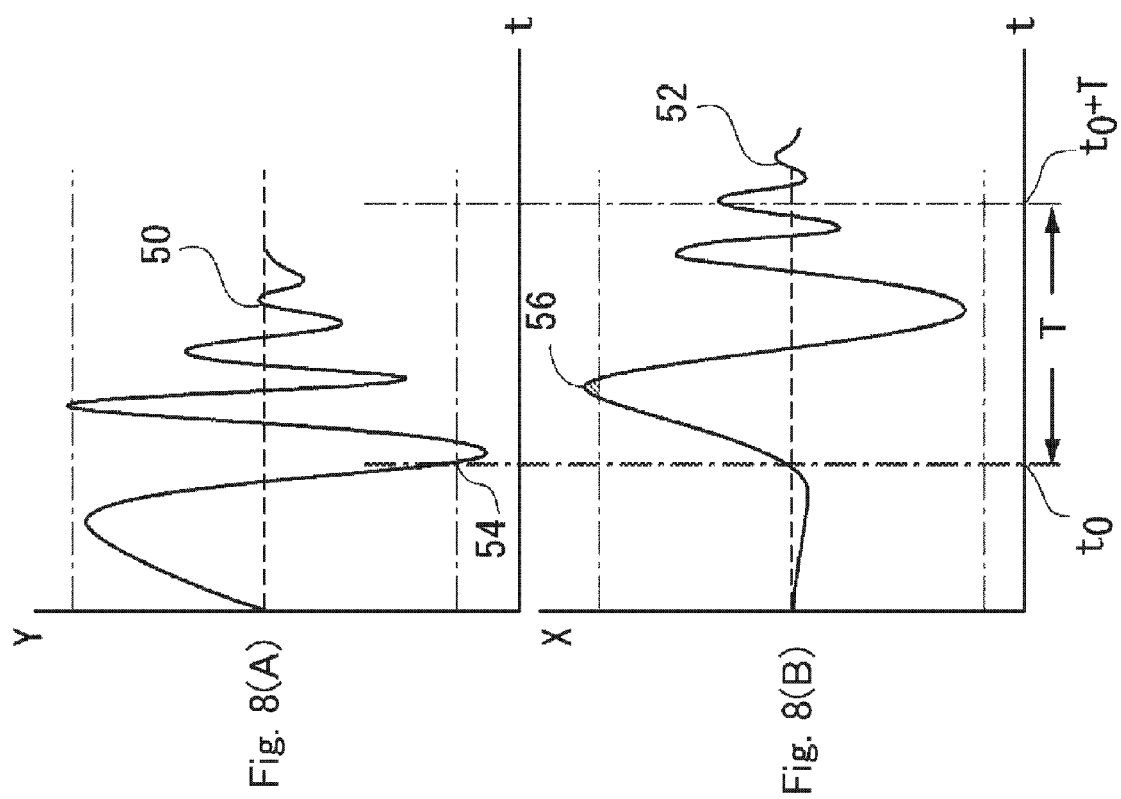
FIG. 8 is a wave form chart for showing schematically acceleration outputs in the X-axis direction and Y-axis direction of the two-axis acceleration sensor circuit 118 when impact is detected.

As shown in FIG. 8(A), first, an A/D converter incorporated in the MCU 112 samples the waveform 50 of the acceleration Y in the direction of Y axis by a sampling frequency thereof, and the position 54 where the absolute value of the acceleration exceeds a certain threshold value is detected. Then, as shown in FIG. 8(B), in the same way, the A/D converter incorporated in the MCU 112 samples the waveform 52 of the acceleration X in the direction of X axis by the sampling frequency thereof during a time period T, and presence or absence of a peak 56 corresponding to the absolute value of the acceleration exceeding the threshold value is determined. When the presence of such peak 56 is determined, it is determined that the impact occurs in the direction of Z axis at the time, and thereby the impact detection signal Z is output. As a matter of logic, this corresponds to AND operation between the case where the absolute value of the acceleration in the direction of Y axis exceeds the threshold value during the certain time period T and the case where the absolute value of the acceleration in the direction of X axis exceeds the threshold value during the certain time period T. In the present embodiment, the threshold value is 1G.

Conversely, as shown in FIG. 9, even if the acceleration in the direction of Y axis exceeds 1G, when the peak 62 exceeding 1G is not detected from the waveform 60 of the acceleration in the direction of X axis during the time period T thence, or when such peak 62 is detected after the passing of the time period T, it is determined that the impact does not occur at the time.

That is, when the absolute value of the acceleration in the direction of X axis exceeds the threshold value 1G within the predetermined time period T after it is determined that the absolute value of the acceleration in the direction of Y axis exceeds the threshold value 1G by such processing, in response to thereto, the impact detection signal Z, which indicates that the impact in the direction of Z axis is detected, is output.

Figure 10:
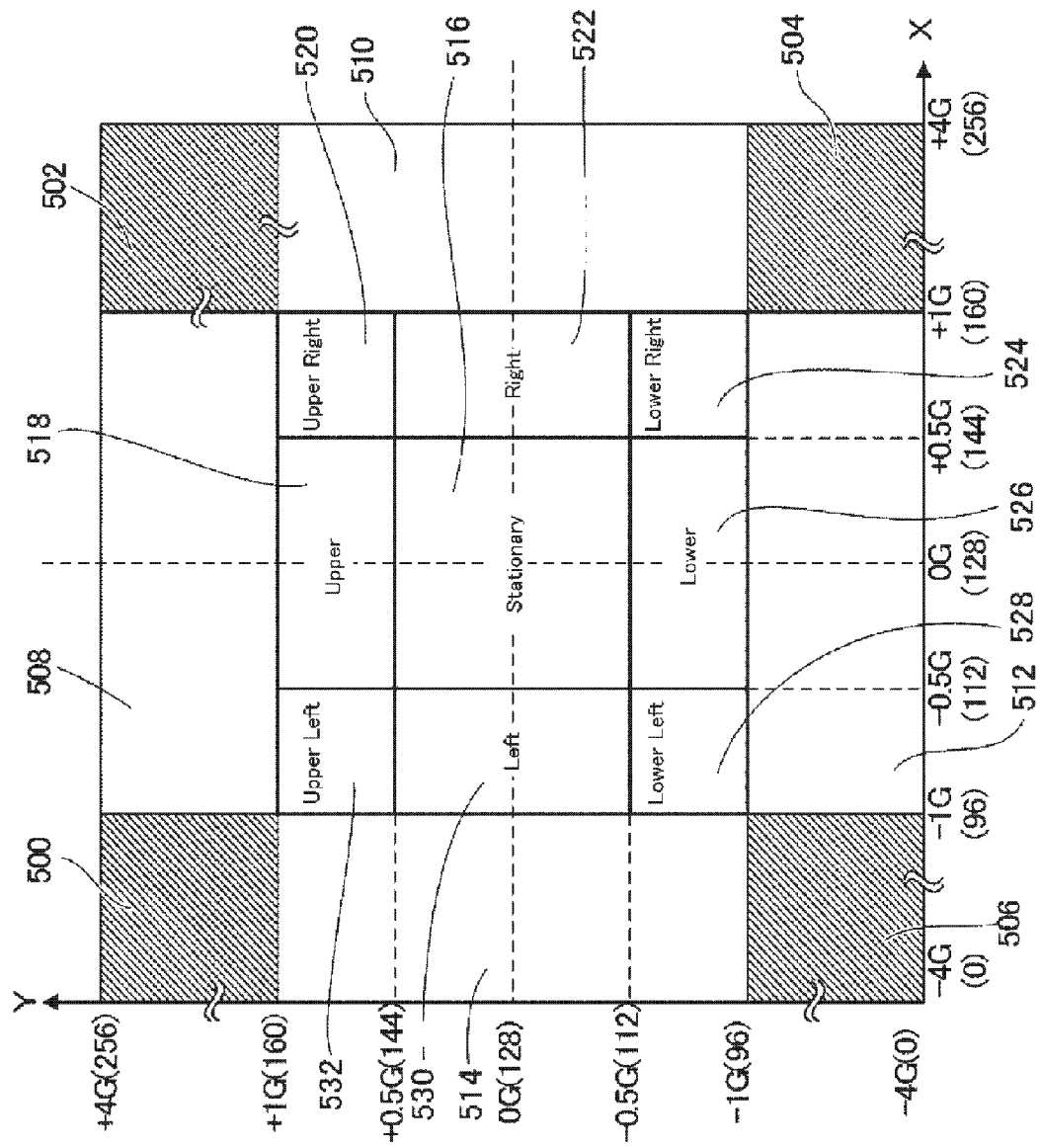
FIG. 10 is a view for showing schematically ranges for use in detection of impact and detection of operation as arrow keys with regard to outputs in the X-axis direction and Y-axis direction of the two-axis acceleration sensor circuit 118.

With regard to the combination of the acceleration value in the direction of X axis and the acceleration value in the direction of Y axis, the shaded areas 500, 502, 504, and 506 of FIG. 10 represent ranges for use in the determination of the occurrence of the impact in the direction of Z axis as described above. When the point to be determined by the value of the acceleration in the direction of X axis and the value of the acceleration in the direction of Y axis belongs to any one of the ranges 500, 502, 504, and 506, it is determined that the impact in the direction of Z axis occurs.

Figure 11:
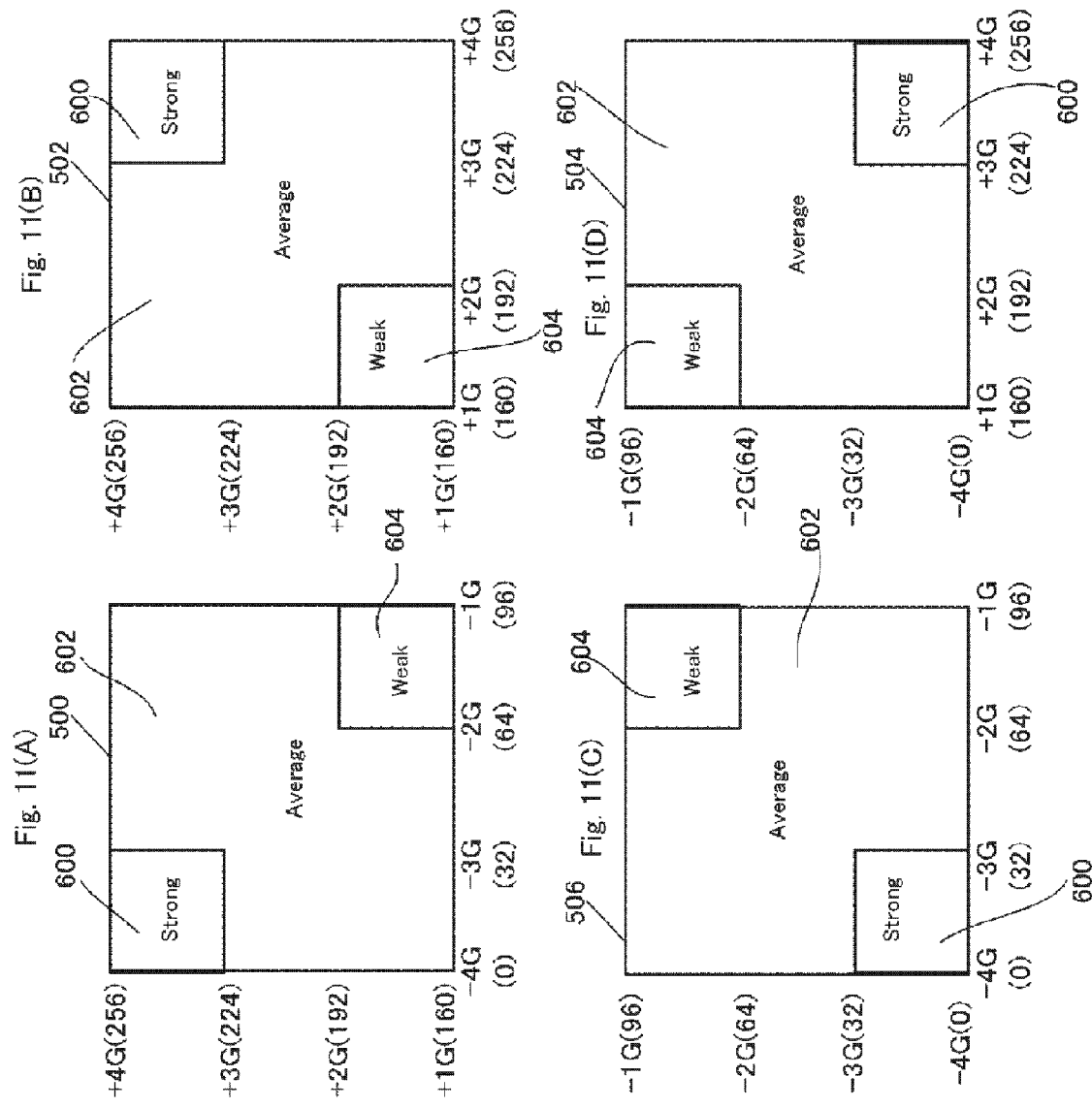
FIG. 11 is an explanatory view for showing ranges 500, 502, 504, and 506 of FIG. 10 in detail.

As shown in FIG. 11, each of the ranges 500, 502, 504, and 506 is still divided into three ranges 600 (the impact is strong), 602 (the impact is average), and 604 (the impact is weak). When the point to be determined by the value of the acceleration in the direction of X axis and the value of the acceleration in the direction of Y axis belongs to the range 600, it is determined that the strong impact occurs, and the impact detection signal Z is set to "0b11". When the point to be determined by the value of the acceleration in the direction of X axis and the value of the acceleration in the direction of Y axis belongs to the range 602, it is determined that the average impact occurs, and the impact detection signal Z is set to "0b10". When the point to be determined by the value of the acceleration in the direction of X axis and the value of the acceleration in the direction of Y axis belongs to the range 604, it is determined that the weak impact occurs, and the impact detection signal Z is set to "0b01". Incidentally, "0b" represents binary number in the present description. It is possible to know the size of the impact by checking the value of the impact detection signal Z.

Returning to FIG. 10, when the point to be determined by the value of the acceleration in the direction of X axis and the value of the acceleration in the direction of Y axis belongs to the range 518, it is determined that the arrow key which indicates the upward movement is operated. When the point to be determined by the value of the acceleration in the direction of X axis and the value of the acceleration in the direction of Y axis belongs to the range 520, it is determined that the arrow key which indicates the oblique movement to the upper right is operated.

When the point to be determined by the value of the acceleration in the direction of X axis and the value of the acceleration in the direction of Y axis belongs to the range 522, it is determined that the arrow key which indicates the rightward movement is operated. When the point to be determined by the value of the acceleration in the direction of X axis and the value of the acceleration in the direction of Y axis belongs to the range 524, it is determined that the arrow key which indicates the oblique movement to the lower right is operated.

When the point to be determined by the value of the acceleration in the direction of X axis and the value of the acceleration in the direction of Y axis belongs to the range 526, it is determined that the arrow key which indicates the downward movement is operated. When the point to be determined by the value of the acceleration in the direction of X axis and the value of the acceleration in the direction of Y axis belongs to the range 528, it is determined that the arrow key which indicates the oblique movement to the lower left is operated.

When the point to be determined by the value of the acceleration in the direction of X axis and the value of the acceleration in the direction of Y axis belongs to the range 530, it is determined that the arrow key which indicates the leftward movement is operated. When the point to be determined by the value of the acceleration in the direction of X axis and the value of the acceleration in the direction of Y axis belongs to the range 532, it is determined that the arrow key which indicates the oblique movement to the upper left is operated.

In this way, the ranges 518 to 532 are used for detecting whether or not the operation corresponding to the arrow key is performed when the casting rod 20 is used as a controller.

On the other hand, when the point to be determined by the accelerations X and Y belongs to the range 516 where corresponds to −0.5G to +0.5G, it is determined that the casting rod 20 remains stationary. It is so as not to regard the movement in some degree as the operation of the arrow key. Because, since a person moves the casting rod 20, even if the operation is not intended, i.e., mere grip, the casting rod 20 moves in some degree. That is, this is because of preventing the chattering caused by the wobbling hand and so on.

Incidentally, in FIG. 10, the ranges 508, 510, 512 and 514 are not used for the above-mentioned every determination.

Figure 12:
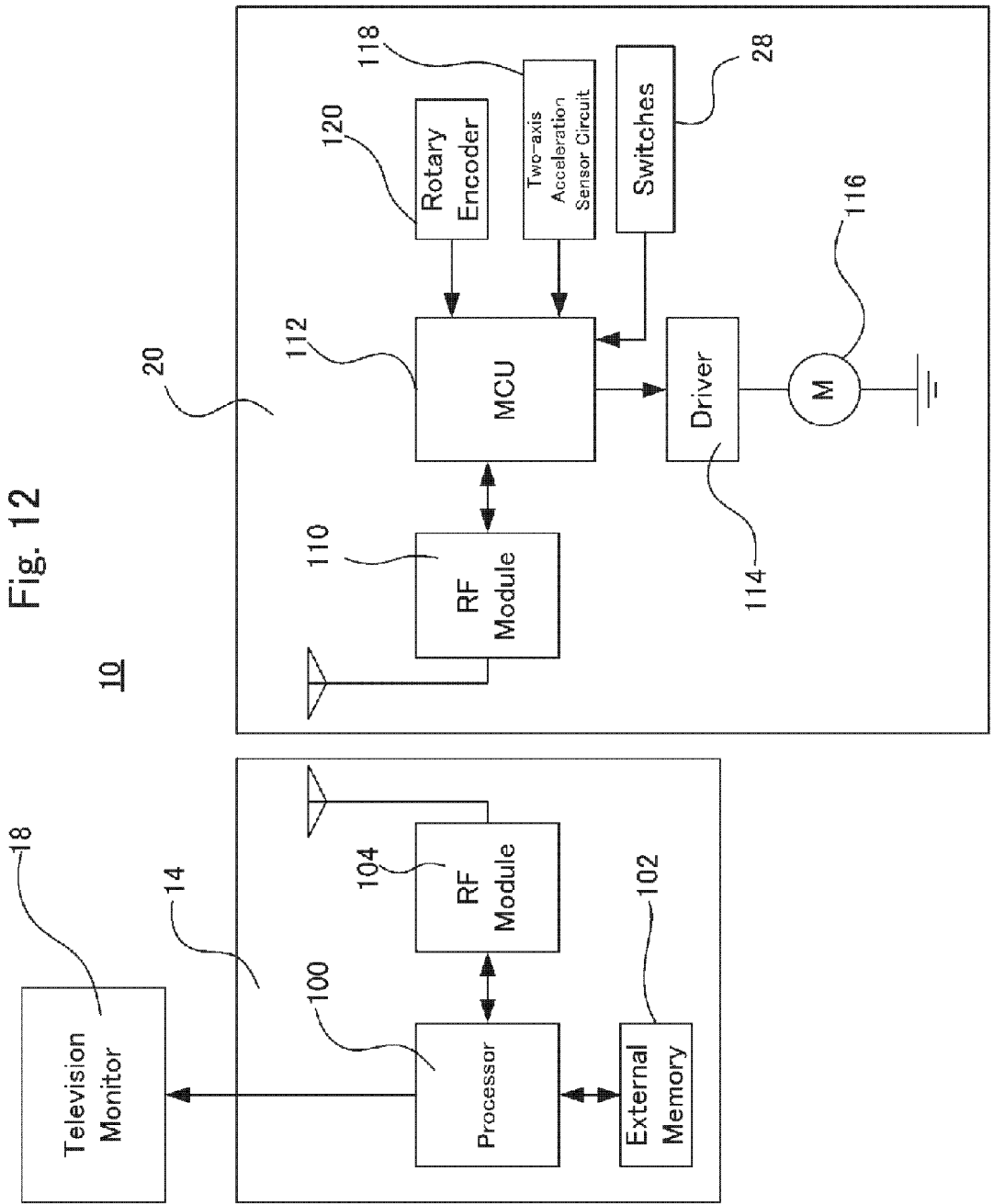
FIG. 12 is a block diagram for showing electrical construction of the simulated fishing experience system of FIG. 1.

FIG. 12 is a block diagram for showing electrical construction of the simulated fishing experience system 10 in accordance with the present embodiment. Referring to FIG. 12, in the simulated fishing experience system 10 in accordance with the present embodiment, the cartridge 14 inserted into the adapter 12 (see FIG. 1) and the casting rod 20 send and receive data as obtained, signals, control data, and so on between each other by wireless communication using a weak radio wave to realize various processes for the simulated fishing experience. The adapter 12 is just a relaying apparatus. For this reason, in FIG. 12, the illustration of the adapter is omitted.

As shown in FIG. 12, in the present embodiment, the cartridge 14 and the casting rod 20 are provided with RF modules 104 and 110 respectively. Also, the processor 100 is incorporated in the cartridge 14, and coupled with the RF module 104. For example, the processor 100 consists of such a high-speed processor as the "XaviX" (name of article) made and sold by the present applicant. Then, as described above, the AV signals generated by the processor 100 are sent to the television monitor 18 through the AV cable 16 from the connector of the adapter 12. The processor 100 of the cartridge 14 is coupled with the external memory 102.

The casting rod 20 is provided with the MCU (Micro Controller Unit) 112 which is connected with the RF module 110. Pulse signals are input to the MCU 112 from two lines of the rotary encoder (photo interrupter) 120. MCU 112 detects a rotation direction and a rotation speed of the handle 30 operated by the player based on the two pulse signals from the rotary encoder 120. The casting rod 20 is further provided with the two-axis acceleration sensor circuit 118. The two-axis acceleration sensor circuit 118 detects the acceleration in the direction of Y axis and the acceleration in the direction of X axis to output the two acceleration correlation signals in the directions of X and Y axes to MCU 112.

The MCU 112 converts the acceleration correlation signals as input into the acceleration data, stores it in its own temporary memory, and transmits it to the processor 100 via the RF modules 110 and 104 if required. The MCU 112 detects the rotation direction and the rotation speed of the handle 30 based on the two pulse signals from the rotary encoder 120, stored them in its own temporary memory, and transmits them to the processor 100 if required.

Also, the MCU 112 inside the casting rod 20 receives the operation signals from the switches 28. The MCU transmits the operation signals to the processor 100 via the RF modules 110 and 104. Incidentally, the switches 28 consist of the switches 28a and 28c of FIG. 2.

The casting rod 20 further includes a motor 116 for applying the load torque to the handle 30 and a driver 114 thereof. The driver 114 is connected with the MCU 112. The MCU 112 gives a motor ON/OFF signal to the driver 114. The motor driver 114 includes a switching transistor (not shown in the figure) which turns on or off in response to the ON/OFF signal. When the switching transistor is turned on, the motor 116 is turned on, conversely when the switching transistor is turned off, the motor 116 is turned off.

The external memory 102 is a ROM (Read Only Memory) and/or a RAM (Random Access Memory), and includes a program area, a data table area, an image data area, and an audio data area. The program area stores control programs shown in FIGS. 16 to 18 as described below. For example, the data table area stores data tables which indicate weather, kinds of fishes depending on the weather, distribution and depth of fishes, size of fishes (weight), and so on for each of different water places (fishing fields). The image data area stores all image data items, such as fishing rods, fishing lines, lures, fishes, distribution maps of fishes, tension indicators, and water places each of which includes the water surface, and the other necessary image data. The audio data area stores sound for music and sound effect.

Although not shown in the figure, the processor 100 includes various functional blocks, such as a CPU (central processing unit), a graphics processor, a sound processor, a DMA (Direct Memory Access) controller and so forth, and in addition to this, includes an A/D converter for receiving analog signals, an input/output control circuit for receiving input digital signals such as key manipulation signals and giving the output digital signals to external devices, an internal memory, and so on.

The CPU executes the control programs stored in the external memory 102. The digital signal from the A/D converter and the digital signal from the input/output control circuit are given to the CPU, and then the CPU executes necessary operation in accordance with these signals based on the control programs. The graphics processor applies graphics processing required by the operation result of the CPU to the image data stored in the external memory 102 to generate video signals corresponding to pictures to be displayed on the television monitor 18. The sound processor applies sound processing required by the operation result of the CPU to the audio data stored in the external memory 102 to generate audio signals corresponding to music and sound effect. For example, the internal memory is a RAM, and is used as a working area, a counter area, a register area, a temporary data area, a flag area and/or the like area.

The processor 100 of the cartridge 14 generates images, music, sound effect and so on for use in the simulated experience of the fishing based on the measurement or detection signal (data) sent from the MCU 112 of the casting rod 20 in the wireless manner to give them to the television monitor 18. Also, the processor 100 transmits the motor control signal, i.e., the motor ON/Off signal to the MCU 112 in the wireless manner. In this case, the processor 100 calculates the tension of the fishing line (in the virtual space) at the time based on the rotation direction data and the rotation speed data of the handle 30 sent from MCU 112 and the size data (weight) of the fish (in the virtual space) which the processor 100 has, and then determines the level of the load torque based on the tension.

By the way, next, the play screens of the simulated fishing experience generated by the processor 100 and displayed on the television monitor 18 will be described with examples.

Figure 13:
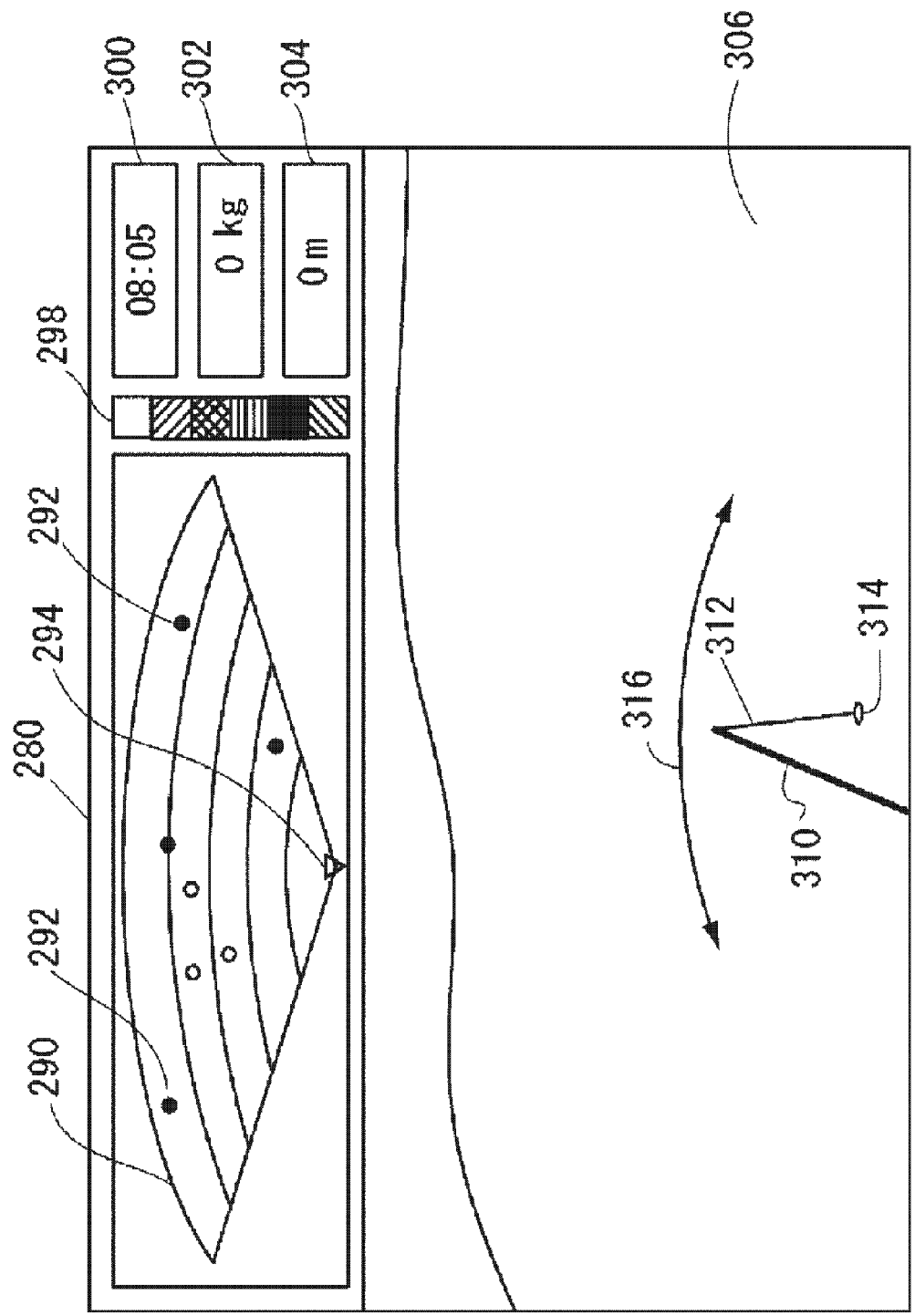
FIG. 13 is a view showing an example of a play screen for the simulated fishing experience.

FIG. 13 is a view showing an example of a play screen for the simulated fishing experience. As shown in FIG. 13, the screen includes a fishing rod object (referred to as a fishing rod in the following description) 310, a fishing line object (referred to as a fishing line in the following description) 312, and a lure object (referred to as a lure in the following description) 314. When the screen is displayed, as shown by the reference numeral "316", the processor 100 sets the direction of the fishing rod 310 to the direction corresponding to the direction which the player indicates with the casting rod 20. In this case, as described below, the casting rod 20 can be operated as the arrow keys. Also, the processor 100 calculates the position where the lure 314 lands on water and the length of the fishing line 312 based on the strength of the casting when the player swings the casting rod 20 down (namely, the strength Z of the impact in the direction of Z axis (weak, average, or strong) or the strength $Z_A$ of the impact in the direction of Z axis (as described below)) and the direction of the fishing rod 310.

Further, the play screen includes a fish distribution map 290, a water depth indicator 298, a time display section 300, a weight display section 302 and a distance display section 304. The fish distribution map 290 indicates the distribution of fishes which live in the lake 306 in the virtual space and the location 294 of the lure 314. Since each of the fishes 292 of the fish distribution map 290 is colored in the color corresponding to the water depth where each fish 292 is located, the player can know the water depth as well as the distribution of fishes. The water depth indicator 298 indicates the depth of the lake 306 with the colors and in the five levels in a unit of three meters. In the figure, the difference of the hatching in the water depth indicator 298 represents the difference of the color. The color of the fish 292 of the fish distribution map 290 is represented in any one of the five-level colors depending on the water depth thereof.

The time display section 300 indicates time in the virtual space. The weight display section 302 indicates the total of the weights of fishes which the player has caught. The distance display section 304 indicates the distance of the casting.

Referring to FIG. 13, the player first determines the direction of casting. In this case, the two-axis acceleration sensor circuit 118 of the casting rod 20 can be used as an input device. That is, when the casting rod 20 is moved from a still position (the range 516 of FIG. 10) along nearly X axis in the positive direction or the negative direction (or turned leftward or rightward around the base end of the grip 24), the point to be determined by the X axis direction component and the Y axis direction component of the gravity acceleration belongs to either the range 530 or 522 of FIG. 10. It is possible to realize a function as right and left arrow keys disposed on an ordinary keyboard by the casting rod 20 using changes of the acceleration signals. Specifically, when the casting rod 20 is moved leftward, the above point belongs to the range 530, conversely when the casting rod 20 is moved rightward, the above point belongs to the range 522. Consequently, when the point determined by the acceleration signals as detected belongs to the range 530, the fact is regarded as depression of the left arrow key, conversely when it belongs to the range 522, the fact is regarded as depression of the right arrow key.

Also, when the casting rod 20 is moved upward or downward (or turned upward or downward around the base end of the grip 24), the point to be determined by the X axis direction component and the Y axis direction component of the gravity acceleration belongs to either the range 518 or 526 of FIG. 10. It is possible to realize the same function as up and down arrow keys disposed on an ordinary keyboard by the casting rod 20 using changes of the acceleration signals. Specifically, when the casting rod 20 is moved upward, the point to be determined by the X axis direction component and the Y axis direction component of the gravity acceleration belongs to the range 518, conversely when the casting rod 20 is moved downward, the point belongs to the range 526. Consequently, when the point determined by the acceleration signals as detected belongs to the range 518, the fact is regarded as depression of the up arrow key, conversely when it belongs to the range 526, the fact is regarded as depression of the down arrow key.

Further, when the casting rod 20 is obliquely moved, the point determined by the X axis direction component and the Y axis direction component of the gravity acceleration belongs to any one of the ranges 520, 524, 528 and 532 of FIG. 10. It is possible to realize the same functions as an upper right diagonal arrow key, a lower right diagonal arrow key, a lower left diagonal key and an upper left diagonal key by the casting rod 20 using changes of the acceleration signals. Specifically, when the casting rod 20 is moved in the oblique direction to the upper right, the point determined by the X axis direction component and the Y axis direction component of the gravity acceleration belongs to the range 520, when the casting rod 20 is moved in the oblique direction to the lower right, the point belongs to the range 524, when the casting rod 20 is moved in the oblique direction to the lower left, the point belongs to the range 528, when the casting rod 20 is moved in the oblique direction to the upper left, the point belongs to the range 532. Consequently, when the point determined by the acceleration signals as detected belongs to the range 520, the fact is regarded as depression of the upper right diagonal key, when the point belongs to the range 524, the fact is regarded as depression of the lower right diagonal key, when the point belongs to the range 528, the fact is regarded as depression of the lower left diagonal key, when the point belongs to the range 532, the fact is regarded as depression of the upper left diagonal key.

When the casting rod 20 is moved so as to realize the functions of the arrow keys as described above, the large acceleration like that made when casting is not caused by the centrifugal force. Accordingly, in this case, since the acceleration value is relatively small, it is assumed that the acceleration values in both the directions of X and Y axes are within the range −1G to 1G. When the acceleration value is within a range other than such range, the processor 100 determines that the operation different from the operation which is assumed as the operation for determining the direction is applied to the casting rod 20, and therefore ignores the accelerations. Needless to say, conversely, when the operation for casting is anticipated, if the acceleration values in both the directions of X and Y axes as detected are within the range −1G to 1G, the processor ignores the accelerations.

Figure 14:
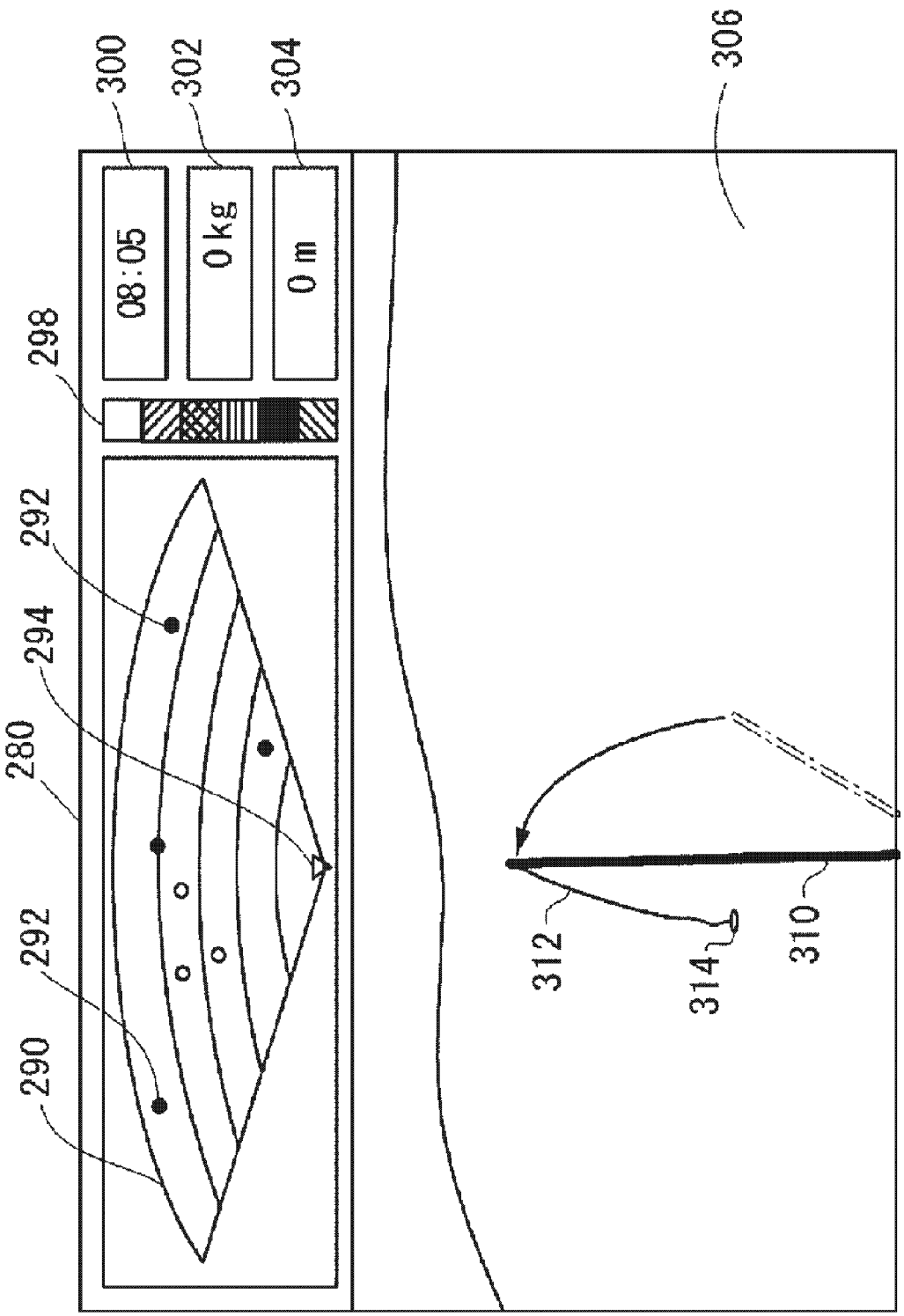
FIG. 14 is a view showing an example of a play screen when casting is started for the simulated fishing experience.

When the simulated fishing experience is started and the player swings the casting rod 20 up so as to perform the casting, the accelerations to be detected by the two-axis acceleration sensor circuit 118 incorporated in the casting rod 20 belong to the range 518 of FIG. 10. The processor 100 receives data, which indicates that the accelerations belong to the range 518, via the RF modules 110 and 104 from MCU 112, and generates the animation in order that the fishing rod 310 is swung up based on the data as shown in FIG. 14. In this case, the processor 100 generates and displays the animation similar to the actual action with regard to the fishing line 312 and the lure 314.

Figure 15:
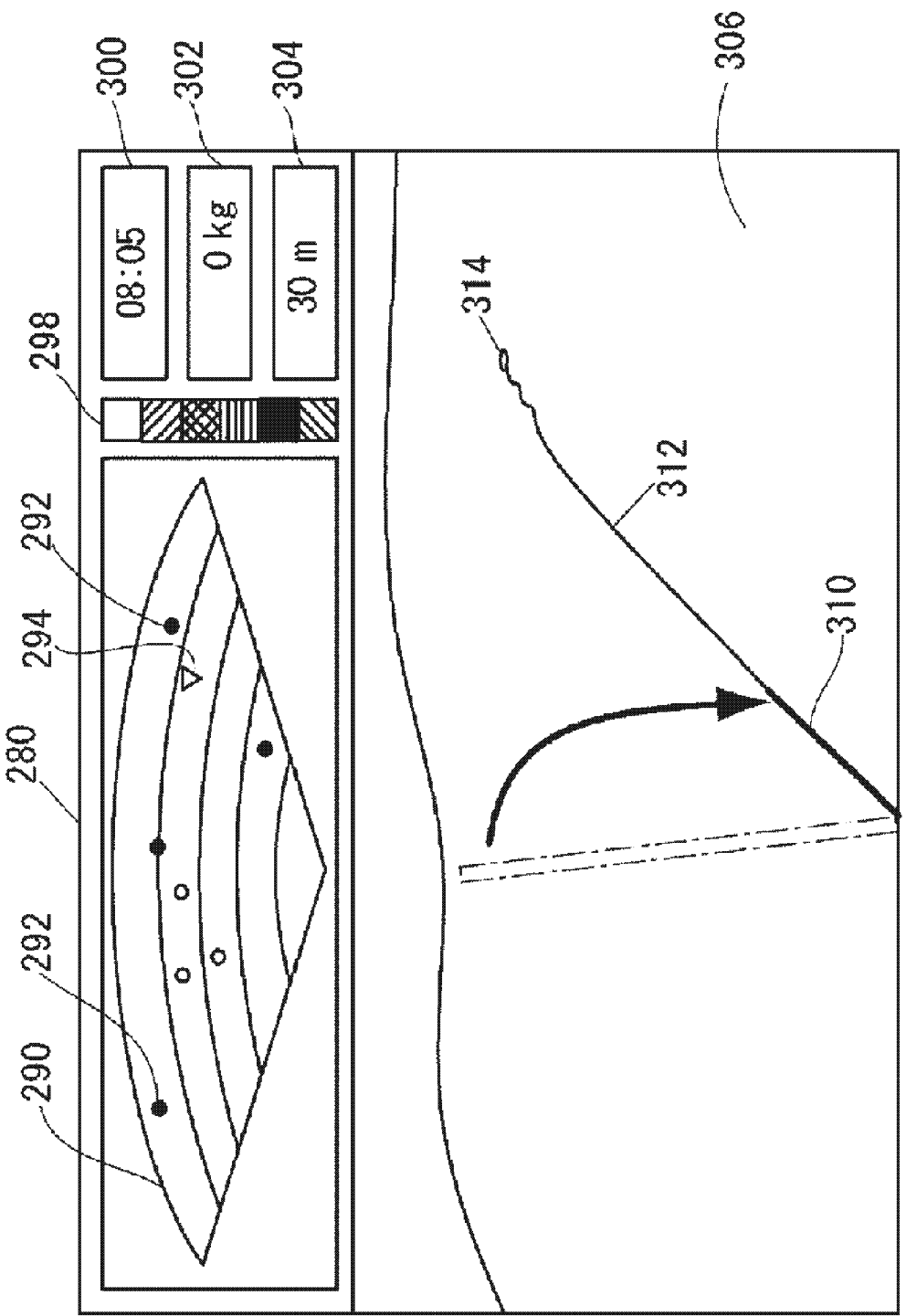
FIG. 15 is a view showing an example of a play screen when the casting is finished for the simulated fishing experience.

Then, when the player swings the casting rod 20 down and tries to stop it, the point to be determined by the accelerations in the directions of the X and Y axes belongs to any one of the ranges 500, 502, 504 and 506 (this corresponds to the detection of the impact in the direction of Z axis). The processor 100 receives data Z, which indicates that the accelerations belong to any one of these ranges, via the RF modules 110 and 104 from MCU 112, and as shown in FIG. 15, the processor 100 generates the animation so that the fishing rod 310 is swung down based on the data Z, and stops the animation of the fishing rod 310 at the stop position of the fishing rod 310. In this case, the position where the lure 314 lands on water is determined based on the strength of the casting (namely, the strength Z of the impact in the direction of Z axis (weak, average, or strong) or the strength $Z_A$ of the impact in the direction of Z axis (as described below)) and the direction of the fishing rod 310, and then the animation is generated so that the fishing line 312 and the lure 314 fly and then the lure 314 lands on water. The distance to the landing position is computed and displayed in the distance display section 304.

In this way, the impact in the direction of Z axis of the casting rod 20, which occurs by sharply stopping swinging down, is detected using only the two-axis acceleration sensor having the directions of X and Y axes. As the result, it is possible to make the animation capable of providing the simulated experience of the actual casting at the timing of the detection of the impact.

Incidentally, when the two-axis acceleration sensor having the directions of X and Y axes is employed as described above, for example, in the case where any one of the plurality of buttons displayed on the screen is tried to be selected, it is possible to select the button by moving a cursor rightward, leftward, upward, downward, and obliquely. Also, if the switch 28a (decision key) is operated when the cursor is located on the position of the desired button, it is detected that the button is depressed. Incidentally, the same function as the decision key may be realized by detecting the impact in the direction of Z axis which is occurred by lightly performing the casting with the casting rod 20 instead of the operation of the decision key.

In the present embodiment, the processor 100 of the cartridge 14 sends request of data to the casting rod 20 for each one frame of the video signal to be sent to the television monitor 18. The casting rod 20 sends a signal which indicates the various operations of the casting rod 20 by the player to the cartridge 14 in response to the request. The processor 100 performs the setting of the scene of the simulated fishing experience, the interpretation of the operation by the player, the calculation of the renewed environment for the simulated experience in accordance with the interpretation, and so on based on the data from the casting rod 20. For example, the request to be sent from the processor 100 to the MCU 112 includes the motor control signal which indicates the load to be applied to the rotation of the handle 30 while fighting. The load is computed by the processor 100 in accordance with the scene of the simulated fishing experience.

Figure 16:
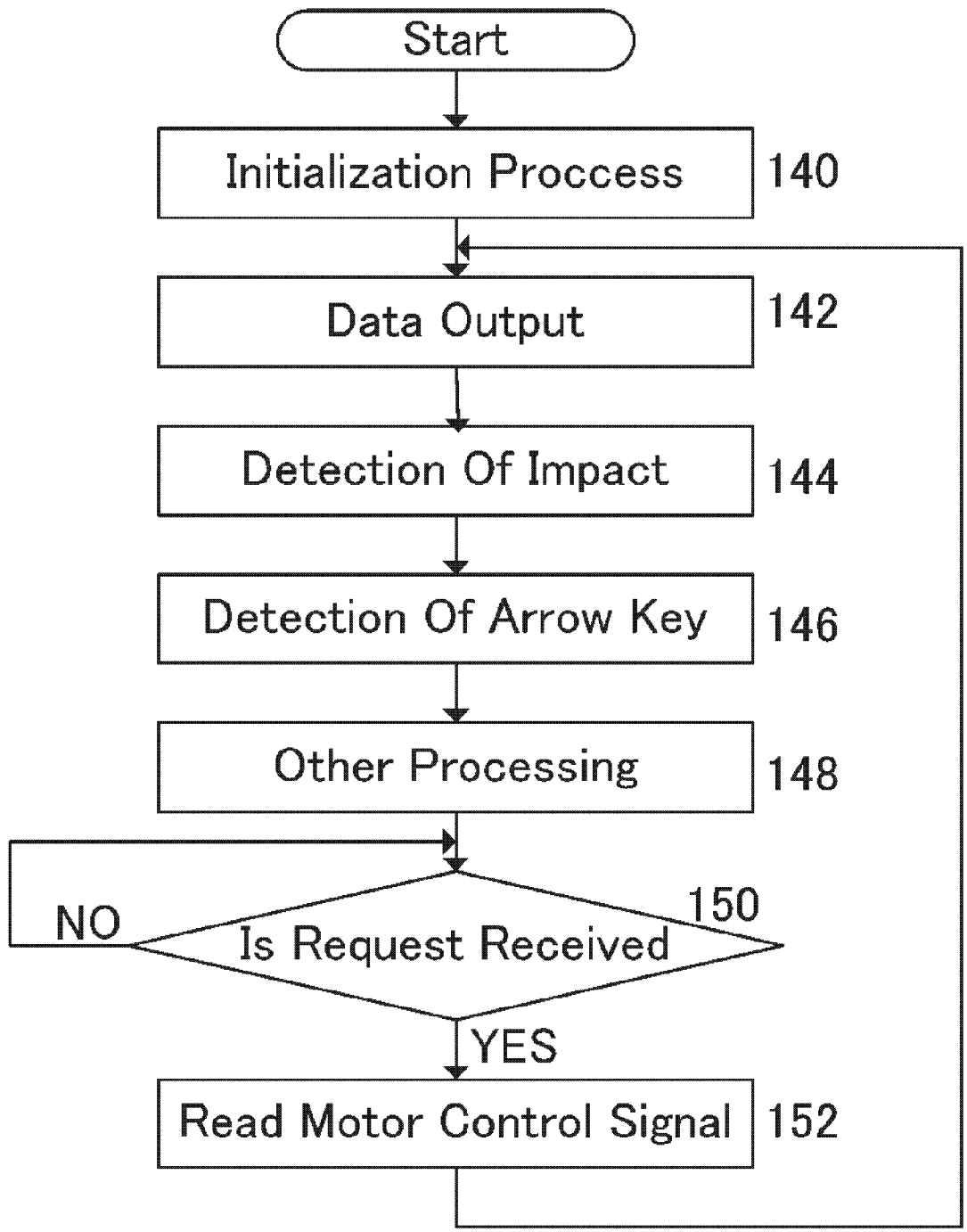
FIG. 16 is a flowchart for showing control structure to be executed by an MCU 112 of the casting rod 20.

FIG. 16 is a flowchart for showing an example of the processing to be executed by MCU 112 of the casting rod 20. The processing is started in response to the power-on of the casting rod 20.

Referring to FIG. 16, in step (referred to as "S" in the following description) 140, the MCU 112 initializes the memories and registers incorporated therein. In S142, MCU 112 outputs data to be sent to the processor 100. In this case, the MCU 112 outputs the data to be sent to the cartridge 14 to the RF module 110 (impact data in the direction of Z axis, direction data (direction flag), rotation velocity data of the handle 30, ON/OFF data of the switches 28 of the casting rod 20, and so on as calculated or acquired in S144, S146 and S148 as described below), and sends the data to the processor 100 via the RF modules 110 and 104.

In step S144, MCU 112 performs the processing for detecting whether or not the impact in the direction of Z axis of the casting rod 20 occurs. The processing will be described below in detail referring to FIG. 17. Subsequently, in S146, the MCU 112 detects whether or not the casting rod 20 serves as the arrow key. The processing of the MCU 112 in this case will be described below in detail referring to FIG. 18. Subsequently, other processing is executed in S148. The processing to be executed in the step includes the processing for reading the output signals from the rotary encoder 120, computing the rotation speed and rotation direction of the handle 30, i.e., the rotation velocity based on the two pulse signals from rotary encoder 120, converting data to be sent to the processor 100, acquiring the ON/OFF data from the switches 28, controlling the motor 116, and so on. Then, in S150, it waits until the request of the data from the processor 100 is received. If the request is received, the process proceeds to S152 to read the control signal of the motor 116 from the request and store it in the temporary buffer. Subsequently, the process proceeds to S142 to send the data, such as the impact data and the direction data, to the processor 100 via RF module 110, and then the processing in S144 and after is repeated.

In S152, MCU 112 acquires the motor control signal from the transmitted data as received from the processor 100 of the cartridge 14. The MCU 112 stores the motor control signal acquired from the received data in the temporary buffer. In step 148 of the next cycle, the motor 116 is driven via the driver 114 using the data. The load when the player turns the handle 30 changes depending on the scene of the simulated experience by the driving.

The processor 100 sends the request for each one frame. Accordingly, the MCU 112 acquires the transmitted data from the processor 100 via the RF module 110 for each one frame.

Figure 17:
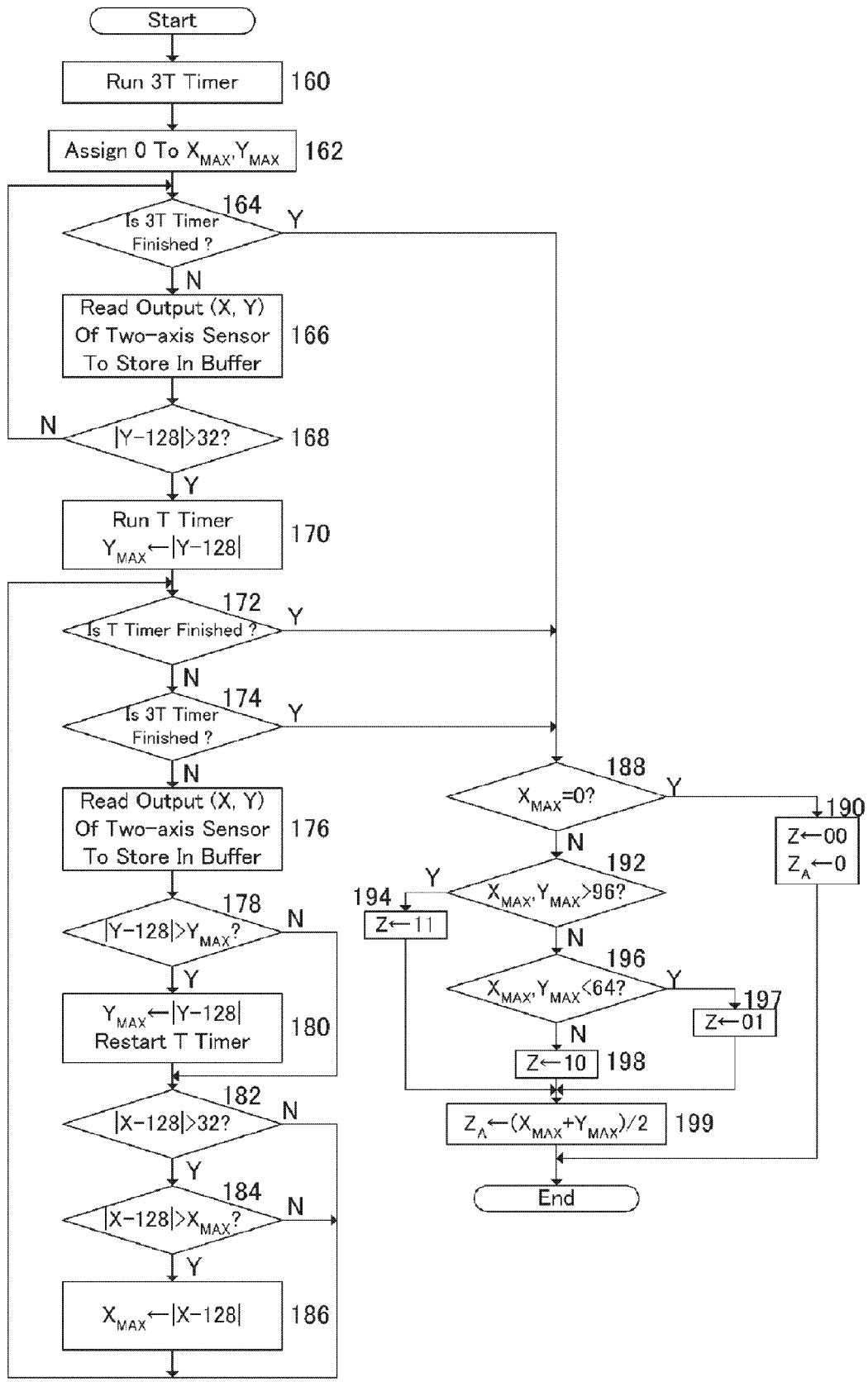
FIG. 17 is a flowchart for showing control structure of impact detection processing to be executed in S144 of FIG. 16.

FIG. 17 shows the detail of the impact detection processing to be executed in step S144 of FIG. 16. Referring to FIG. 17, in S160, a timer (referred to as "3T timer" in the following description) which measures a predetermined time period 3T is run. Incidentally, the "T" is a time set so as to detect the impact in the direction of Z axis, i.e., as shown in FIGS. 8 and 9, such a time as presence of the impact is determined when the acceleration in the direction of X axis exceeds the threshold value 1G within the time period T after the magnitude of the acceleration in the direction of Y axis exceeds the predetermined threshold value 1G. In this case, the output of the two-axis acceleration sensor circuit 118 is monitored only during the time period 3T corresponding to the three times of the above time T as the window for performing the determination.

Subsequently, in S162, the value "0" is assigned to the variables $X_{MAX}$ and $Y_{MAX}$ which respectively represent the maximum values of the amounts obtained by subtracting the value 1G from the absolute values of the accelerations in the directions of X and Y axes observed during the time period 3T. In the present embodiment, each of the values (refer to the value in the direction of X axis as "X" and refer to the value in the direction of Y axis as "Y") which are output by the two-axis acceleration sensor circuit 118 and represent the accelerations is within the range 0 to 255. The values 0, 32, 64, 96, 128, 160, 192, 244, and 256 correspond to the values −4G, −3G, −2G, −1G, 0G, +1G, +2G, +3G, and +4G (however, since the upper limit is 255, +4G can not be measure) respectively. The variables $X_{MAX}$ and $Y_{MAX}$ respectively represent the maximum values (positive) of the parts exceeding 1G when the absolute values of the values X and Y representing the accelerations in the directions of X and Y axes exceed 1G.

In S164, it is determined whether or not the 3T timer finishes, i.e., the window for observing the occurrence of the impact ends. If it finishes, the process proceeds to S188, otherwise the process proceeds to S166. The processing in S188 and after will be described below.

In S166, the values X and Y output from the two-axis acceleration sensor circuit 118 ($0 \leq X, Y \leq 255$) are read and stored in a predetermined buffer.

In S168, it is determined whether or not the absolute value of "Y-128" exceeds 32. As described above, since "128"

corresponds to 0G, if the absolute value of "Y-128" exceeds 32, the acceleration in the direction of Y axis exceeds 1G. If the determination result in S168 is YES, the process proceeds to S170, otherwise the process returns to S164.

In S170, a T timer is run. The T timer measures the time period T. Also, in S170, the value |Y-128| is assigned to the variable $Y_{MAX}$.

In S172, it is determined whether or not the T timer finishes. If the T timer finishes, the process proceeds to S188. If the T timer does not finish, the process proceeds to S174.

In S174, it is determined whether or not the 3T timer finishes. If the 3T timer finishes, the process proceeds to S188. If the 3T timer does not finish, the process proceeds to S176.

In S176, the output data X and Y of the two-axis acceleration sensor circuit 118 are read and stored in predetermined buffers respectively.

In S178, it is determined whether or not the value |Y-128| exceeds the value $Y_{MAX}$. If it exceeds, in S180, the value |Y-128| is assigned to $Y_{MAX}$ and the T timer restarts.

In S182, it is determined whether or not the value |X-128| exceeds 32. As described above, since "128" corresponds to 0G, if the absolute value of "X-128" exceeds 32, the acceleration in the direction of X axis exceeds 1G. If the determination result in S182 is YES, the process proceeds to S184, otherwise the process returns to S172.

Subsequently, in S184, it is determined whether or not the value |X-128| exceeds the value $X_{MAX}$. If it exceeds, in S186, the value |X-128| is assigned to $X_{MAX}$. After that, the process returns to S172.

When the processing in S172 to S186 is repeated, the value |Y-128| is assigned to $Y_{MAX}$ each time the value |Y-128| exceeds 32. The T timer restarts at the same time, and the value |X-128| is assigned to $X_{MAX}$ if the value |X-128| exceeds 32 before the T timer finishes. If the value |X-128| does not exceed 32 by earlier one of the finish of the T timer and the finish of the 3T timer, the value $X_{MAX}$ remains the initial value, i.e., 0.

By the way, in S188, it is determined whether or not the value $X_{MAX}$ is 0. If $X_{MAX}=0$, in S190, 0b00 is assigned to the variable Z which represents the impact in the direction of Z axis in incremental steps (strong, average, or weak), and the value 0 is assigned to the variable $Z_A$ which represents the impact in the direction of Z axis. On the other hand, if $X_{MAX}$ is not 0, the value of the acceleration in the direction of X axis exceeds 1G within the time period T after the value of the acceleration in the direction of Y axis has the maximum value exceeding 1G. Accordingly, it is determined that the impact in the direction of Z axis occurs, and then the process proceeds to next S192.

In S192, it is determined whether or not both $X_{MAX}$ and $Y_{MAX}$ exceed 96. As described above, since "128" corresponds to 0G, if both $X_{MAX}$ and $Y_{MAX}$ exceed 96, both the accelerations in the directions of X and Y axes exceed 3G. That is, the point determined by the accelerations in the directions of X and Y axes belongs to the range 600 of FIG. 11, and therefore it is determined that the strong impact is detected. Accordingly, if both $X_{MAX}$ and $Y_{MAX}$ exceed 96, the process proceeds to S194, and then 0b00 which represents the detection of the strong impact is assigned to the variable Z. On the other hand, otherwise the process proceeds to S196.

In S196, it is determined whether or not both $X_{MAX}$ and $Y_{MAX}$ are less than 64. As described above, since "128" corresponds to 0G, if both $X_{MAX}$ and $Y_{MAX}$ are less than 64, both the accelerations in the directions of X and Y axes are less than 2G. That is, the point determined by the accelerations in the directions of X and Y axes belongs to the range 604 of FIG. 11, and therefore it is determined that the weak impact is detected. Accordingly, if both $X_{MAX}$ and $Y_{MAX}$ are less than 64, the process proceeds to S197, and then 0b01 which represents the detection of the weak impact is assigned to the variable Z. On the other hand, otherwise, the point determined by the accelerations in the directions of X and Y axes belongs to the range 602 of FIG. 11, therefore it is determined that the average impact is detected, and then the process proceeds to S198. In S198, 0b10 which represents the detection of the average impact is assigned to the variable Z.

In the present embodiment, in S199, a function of $X_{MAX}$ and $Y_{MAX}$, e.g., an arithmetic mean value thereof is employed as the value of the variable $Z_A$. The processing finishes after that.

In the above processing, each of the ranges 500, 502, 504 and 506 of FIG. 11 is divided into the three ranges 600, 602 and 604 to represent the size of the impact in the three levels. However, the number of the division and ranges (namely, the number and ranges/shapes of the ranges which represent the size of the impact) is not limited to this, and can be change optionally. For example, the division may not be performed unless it is necessary to hierarchically know the size of the impact. Also, the number of the division should be four or more if it is necessary to know the size of the impact hierarchically in more detail. Needless to say, the number of the division may be two.

Also, in the above processing, the maximum value of the difference between the absolute value of the acceleration in the direction of Y axis and 1G, and the maximum value of the difference between the absolute value of the acceleration in the direction of X axis and 1G are obtained during until the time T elapses after the absolute value of the acceleration in the direction of Y axis exceeds 1G once, and thereby the value of the variable $Z_A$ is determined as the function of these values. Consequently, the value of $Z_A$ indicates the size of the impact with a certain level of accuracy. However, the present invention is not limited to such embodiment. For example, in the case where the lower accuracy of the size of the impact is allowed, the value of the variable $Z_A$ may be determined based on a function of a difference between an absolute value of the acceleration in the direction of Y axis and 1G when the absolute value first exceeds 1G, and a difference between an absolute value of the acceleration in the direction of X axis and 1G when the absolute value first exceeds 1G within a predetermined time period thence. Or, the value of the variable $Z_A$ may be determined based on magnitude of a difference between an absolute value of the acceleration in the direction of Y axis and 1G when the absolute value first exceeds 1G.

Incidentally, the MCU 112 may send the acceleration data in the directions of X and Y axes of the casting rod 20 to the processor 100, and then the processor 100 may execute the above processing of FIG. 17. Needless to say, the acceleration data in the directions of X and Y axes may be sent to the processor 100 in addition to the above processing of FIG. 17.

Figure 18:
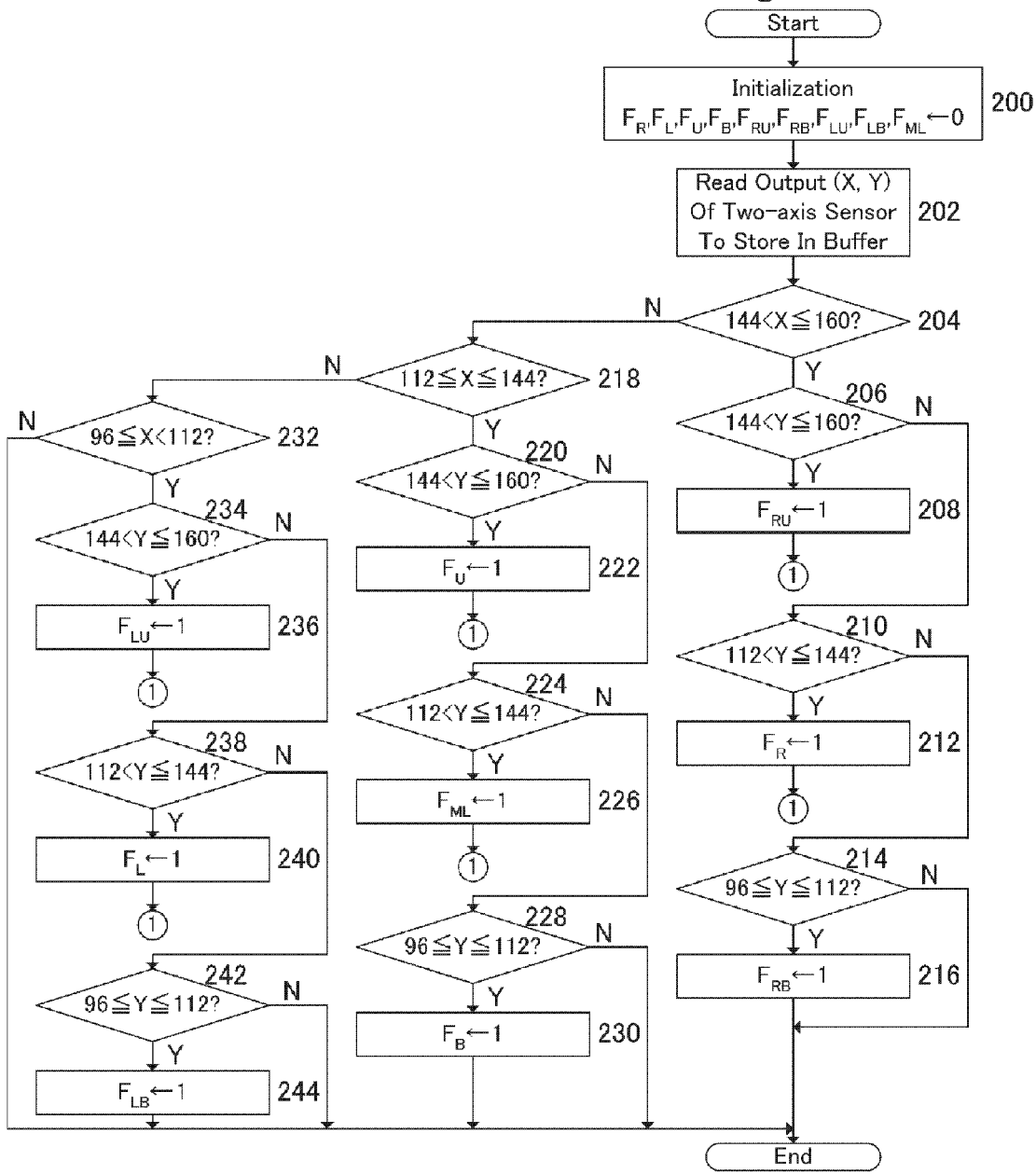
FIG. 18 is a flowchart for showing control structure of arrow-key detection processing to be executed in S146 of FIG. 16.

FIG. 18 is a flowchart for showing arrow-key detection processing to be executed in S146 of FIG. 16. Even in this case, the output data X and Y of the two-axis acceleration sensor circuit 118 are used.

First, the initialization process is executed in S200. In the process, the value 0 is assigned to flags $F_R$, $F_L$, $F_U$, $F_B$, $F_{RU}$, $F_{RB}$, $F_{LU}$, $F_{LB}$ and $F_{ML}$. The respective flags indicate that the point determined by the accelerations in the directions of X and Y axes of the casting rod 20 belongs to ranges 522, 530, 518, 526, 520, 524, 532, 528, and 516 of FIG. 10. That is, the flags $F_R$, $F_L$, $F_U$, $F_B$, $F_{RU}$, $F_{RB}$, $F_{LU}$, $F_{LB}$ and $F_{ML}$ indicate respectively that the casting rod 20 is moved (turned) rightward, moved (turned) leftward, moved (turned) upward, moved (turned) downward, moved in the oblique direction to upper right, moved in the oblique direction to lower right, moved in the oblique direction to upper left, moved in the oblique direction to lower left, and stopped. It is assumed that each flag indicates that the casting rod 20 is moved (turned) in the corresponding direction when the value "1" is assigned thereto, and indicates that the casting rod 20 is not moved (turned) in the corresponding direction when the value "0" is assigned thereto. Since the casting rod 20 transmits the flag as the data to the processor 100, it is possible to reduce a transmission data amount in comparison with the case where the raw acceleration data in the directions of X and Y axes is transmitted as it is. Also, it is possible to reduce a processing amount of the processor 100. However, needless to say, if the transmission velocity is sufficiently fast, the acceleration data may be transmitted as it is. In this case, the processing of FIG. 18 is executed by the processor 100. Needless to say, the acceleration data in the directions of X and Y axes may be sent to the processor 100 in addition to the processing of FIG. 18.

In S202, the values X and Y indicating the accelerations output by the two-axis acceleration sensor circuit 118 are read and stored in a predetermined buffer.

In S204, it is determined whether or not the value X exceeds 144 and is 160 or less. If this condition is satisfied, the process proceeds to S206, otherwise the process proceeds to S218. The processing of S204 to S216 is processing for determining to which of the ranges 520, 522 and 524 of FIG. 10 the point determined by the values X and Y belongs.

In S206, it is determined whether or not the value Y exceeds 144 and is 160 or less. If this condition is satisfied, the process proceeds to S208, otherwise the process proceeds to S210. In S208, the value 1 is assigned to the flag $F_{RU}$ which indicates that the point determined by the values X and Y belongs to the range 520.

In S210, it is determined whether or not the value Y exceeds 112 and is 144 or less. If this condition is satisfied, the process proceeds to S212, otherwise the process proceeds to S214. In S212, the value 1 is assigned to the flag $F_R$ which indicates that the point determined by the values X and Y belongs to the range 522.

In S214, it is determined whether or not the value Y is 96 or more and is 112 or less. If this condition is satisfied, the process proceeds to S216, otherwise the process ends. In S216, the value 1 is assigned to the flag FRB which indicates that the point determined by the values X and Y belongs to the range 524.

On the other hand, in S218 after "NO" is determined in S204, it is determined whether or not the value X is 112 or more and is 144 or less. If this condition is satisfied, the process proceeds to S220, otherwise the process proceeds to S232. The processing of S218 to S230 is processing for determining to which of the ranges 518, 516 and 526 of FIG. 10 the point determined by the values X and Y belongs.

In S220, it is determined whether or not the value Y exceeds 144 and is 160 or less. If this condition is satisfied, the process proceeds to S222, otherwise the process proceeds to S224. In S222, the value 1 is assigned to the flag $F_U$ which indicates that the point determined by the values X and Y belongs to the range 518.

In S224, it is determined whether or not the value Y exceeds 112 and is 144 or less. If this condition is satisfied, the process proceeds to S226, otherwise the process proceeds to S228. In S226, the value 1 is assigned to the flag $F_{ML}$ which indicates that the point determined by the values X and Y belongs to the range 516.

In S228, it is determined whether or not the value Y is 96 or more and is 112 or less. If this condition is satisfied, the process proceeds to S230, otherwise the process ends. In S230, the value 1 is assigned to the flag $F_B$ which indicates that the point determined by the values X and Y belongs to the range 526.

On the other hand, in S232 after "NO" is determined in S218, it is determined whether or not the value X is 96 or more and is less than 112. If this condition is satisfied, the process proceeds to S234, otherwise the process ends. The processing of S232 to S244 is processing for determining to which of the ranges 532, 530 and 528 of FIG. 10 the point determined by the values X and Y belongs.

In S234, it is determined whether or not the value Y exceeds 144 and is 160 or less. If this condition is satisfied, the process proceeds to S236, otherwise the process proceeds to S238. In S236, the value 1 is assigned to the flag $F_{LU}$ which indicates that the point determined by the values X and Y belongs to the range 532.

In S238, it is determined whether or not the value Y exceeds 112 and is 144 or less. If this condition is satisfied, the process proceeds to S240, otherwise the process proceeds to S242. In S240, the value 1 is assigned to the flag $F_L$ which indicates that the point determined by the values X and Y belongs to the range 530.

In S242, it is determined whether or not the value Y is 96 or more and is 112 or less. If this condition is satisfied, the process proceeds to S244, otherwise the process ends. In S244, the value 1 is assigned to the flag $F_{LB}$ which indicates that the point determined by the values X and Y belongs to the range 528.

By the way, with regard to operation, in a mode for selecting a direction of the fishing rod 310, first, the player adjusts the direction of the fishing rod 310 displayed on the television monitor 18 to the desired direction by turning the casting rod 20 rightward or leftward. In this case, the above flags $F_R$, $F_L$, $F_U$, $F_B$, $F_{RU}$, $F_{RB}$, $F_{LU}$, $F_{LB}$ and $F_{ML}$ are used. The direction of the fishing rod 310 is the direction of the casting. Then, the player swings the casting rod 20 to perform the casting operation. In that case, it is determined whether or not the impact in the direction of Z axis occurs based on the output in the direction of X axis and the output in the direction of Y axis of the two-axis acceleration sensor circuit 118, and then the variables Z and $Z_A$ are set to the corresponding values. The timing and strength of the casting are determined by the variables Z and $Z_A$.

The processor 100 generates the situation of the simulated fishing experience based on the initial data to display it on the television monitor 18. The processor 100 sends the request signal of the data to the MCU 112 for each one frame of the picture to be displayed on the television monitor 18. The MCU 112 replies to the processor 100 to send the rotation velocity data of the handle 30 on the basis of the rotary encoder 120, the output data of the switches 28, and the data Z and $Z_A$ representing the impact in the direction of Z axis obtained from the output of the two-axis acceleration sensor circuit 118 for each one frame. The processor 100 interprets the data optionally in accordance with the operation phase of the simulated experience program. Incidentally, if the acceleration data items X and/or Y are transmitted, the processor 100 can utilize these data items for processing.

The processor 100 updates the situation of the simulated experience using the data from the MCU 112 during the execution of the simulated experience. That is, the processor 100 computes the direction, the tilt and so on of the fishing rod 310 based on the data from the MCU 112 to update the screen. At this time, if some condition is satisfied, the processor 100 determines the hit of the fish, and then sends the motor control signal to the MCU 112 of the casting rod 20 so as to increase the load torque to be applied to the handle 30. The MCU 112 controls ON and OFF of the motor 116 in response to the signal to change the load torque to be applied to the handle 30 which rotates.

By the way, as described above, in accordance with the present embodiment, since the casting rod 20 and the cartridge 14 are separated each other, the player can easily move the casting rod 20 in comparison with the case where they are connected with each other in a wired manner. In addition, although they are connected with each other in the wireless manner, since the cartridge 14 can control the representation of the fishing based on the rotation velocity of the handle 30 of the casting rod 20 and the acceleration of the casting rod 20, it is possible to improve reality of the simulated fishing experience. Also, the casting rod 20 can control the load to be applied to the handle 30 based on the representation by the cartridge 14.

Further, when the casting rod 20 is swung down and thus the casting operation is performed, it is possible to detect the impact in the direction of Z axis of the casting rod 20 by the simple processing using the two-axis acceleration sensor circuit 118. Since the impact in the direction of Z axis is detected without using a three-axis acceleration sensor, it is possible to reduce the cost of manufacturing the casting rod 20.

Also, it is possible to detect the moving direction (or the rotating direction) of the casting rod 20 using the output data from the two-axis acceleration sensor circuit 118. It is possible to set the operation condition of the simulated fishing experience by regarding to the detection result as the operation corresponding to the arrow key.

In these cases, there is no need for considering, in the casting rod 20, the usage of the information acquired from the two-axis acceleration sensor circuit 118, the casting rod 20 sends just the value indicating the impact as detected and the flag indicating the moving direction (or the rotating direction) of the casting rod 20 to the cartridge 14, and therefore need not execute complicated processing in accordance with the scene of the simulated experience. Consequently, since it is only necessary to incorporate the MCU 112 which has lower performance than the processor 100 of the cartridge 14 in the casting rod 20, both the casting rod 20 and the cartridge 14 need not have a processor or an MCU with the same performance. As the result, it is possible to reduce the cost.

Incidentally, in the above embodiment, radio system using the weak radio wave is employed so as to send and receive signals and data between the processor 100 of the cartridge 14 and the MCU 112 of the casting rod 20. However, the signals and data may be sent and received by the infrared ray instead of the radio wave. In this case, while it is only necessary to incorporate an infrared transceiver in both the cartridge 14 and the casting rod 20, since it is difficult to send and receive the infrared ray if there is a shielding object between, an infrared transceiver of the casting rod 20 and an infrared transceiver of the cartridge 14 need come in view each other (both are not shown in the figure). If the radio wave is utilized, there is not such restriction.

In the above embodiment, the upward, downward, rightward, leftward, and oblique movements (or turns) of the casting rod 20 are used so as to realize the function of arrow keys which are mounted in an ordinary controller. This scheme can be applied to various cases as well as the present embodiment.

Figure 19:
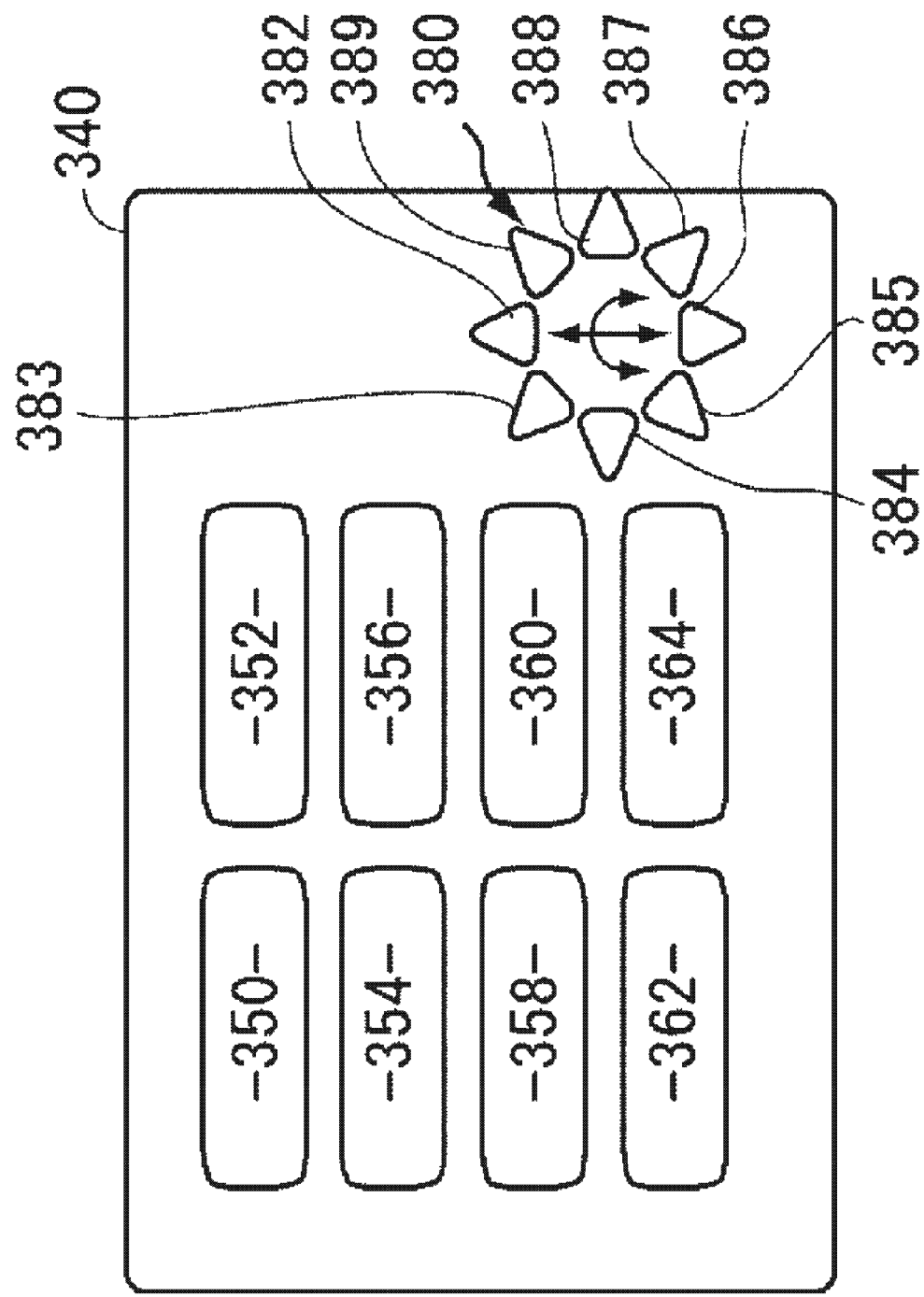
FIG. 19 is a view showing an example of a GUI screen including a plurality of buttons and a key 380.

For example, a GUI (Graphical User Interface) screen 340 of FIG. 19 will be sited. The GUI screen 340 includes a plurality of buttons 350 to 364 which are two-dimensionally arranged, and a key 380 on the extreme right which consists of eight arrow keys 382 to 389. In generally, in the case where one of the plurality of the buttons 350 to 364 is selected, the cursor (it may be a pointer or a focus) is moved to the desired button by operating the arrow keys 382 to 389 and subsequently a decision key is operated. However, in the present embodiment, by changing the position of the casting rod 20, i.e., the controller in itself, it is possible to move the cursor just like the case where the arrow keys 382 to 389 are operated.

In this case, the above flags $F_R$, $F_L$, $F_U$, $F_B$, $F_{RU}$, $F_{RB}$, $F_{LU}$ and $F_{LB}$ correspond to the buttons 388, 384, 382, 386, 389, 387, 383 and 385 respectively. The processor 100 determines that the button corresponding to the flag set to "1" is operated.

Figure 20:
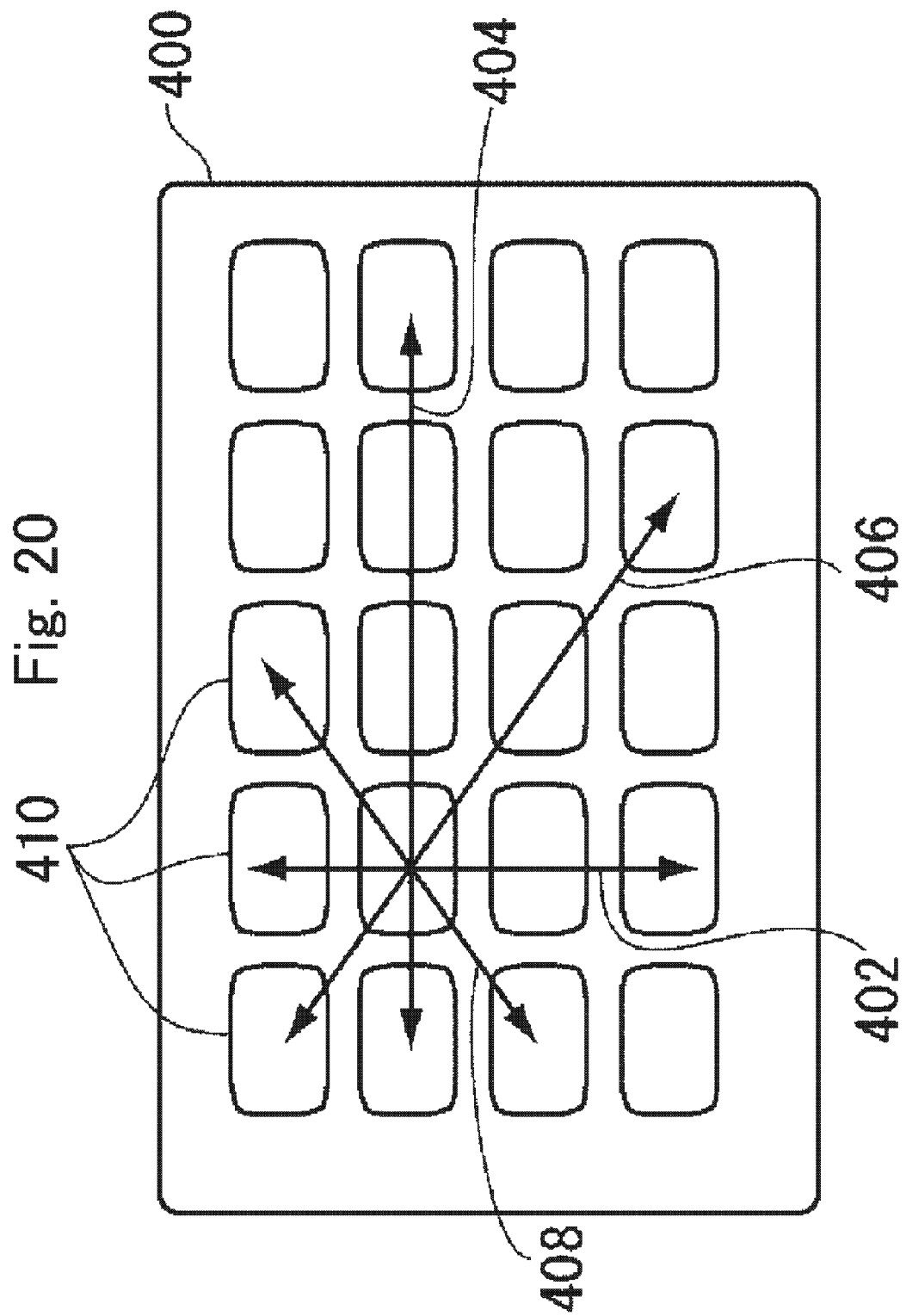
FIG. 20 is a view showing an example of a GUI screen including many buttons.

Also, in a GUI screen 400 of FIG. 20, although only a plurality of buttons 410 is displayed and the key 380 of FIG. 19 is not displayed, it is possible to move the cursor to any location along the horizontal direction 404, the vertical direction 402 or the oblique direction 408 by changing the position of the casting rod 20.

In this case, the above flags $F_R$, $F_L$, $F_U$, $F_B$, $F_{RU}$, $F_{RB}$, $F_{LU}$ and $F_{LB}$ correspond to the right direction, the left direction, the upper direction, the lower direction, the oblique direction to upper right, the oblique direction to lower right, the oblique direction to upper left, and the oblique direction to lower left respectively. The processor 100 moves the cursor to the direction corresponding to the flag set to "1".

Incidentally, in place of the depression of the decision key, as described in the above embodiment, it may be determined that the decision key is depressed when the impact in the direction of the third axis different from two axes of the two-axis acceleration sensor circuit 118 is detected (e.g., other than Z=0b00). In this case, since the controller need not have the decision key, the controller can be designed to resemble an actual instrument.

In this way, since such controller as the casting rod 20 can be used as the arrow keys, it is easily possible to realize control by which a specified object displayed during the simulated experience is moved and rotated using the controller. Further, it is possible to realize the experience as simulated such motion as, e.g., an object is far thrown, by using the above detection of the impact in the direction of Z axis.

Still further, it is possible to select not only objects located two-dimensionally on the screen of the television monitor 18 but also objects located three-dimensionally by using the interface with the above two-axis acceleration sensor circuit 118.

Figure 21:
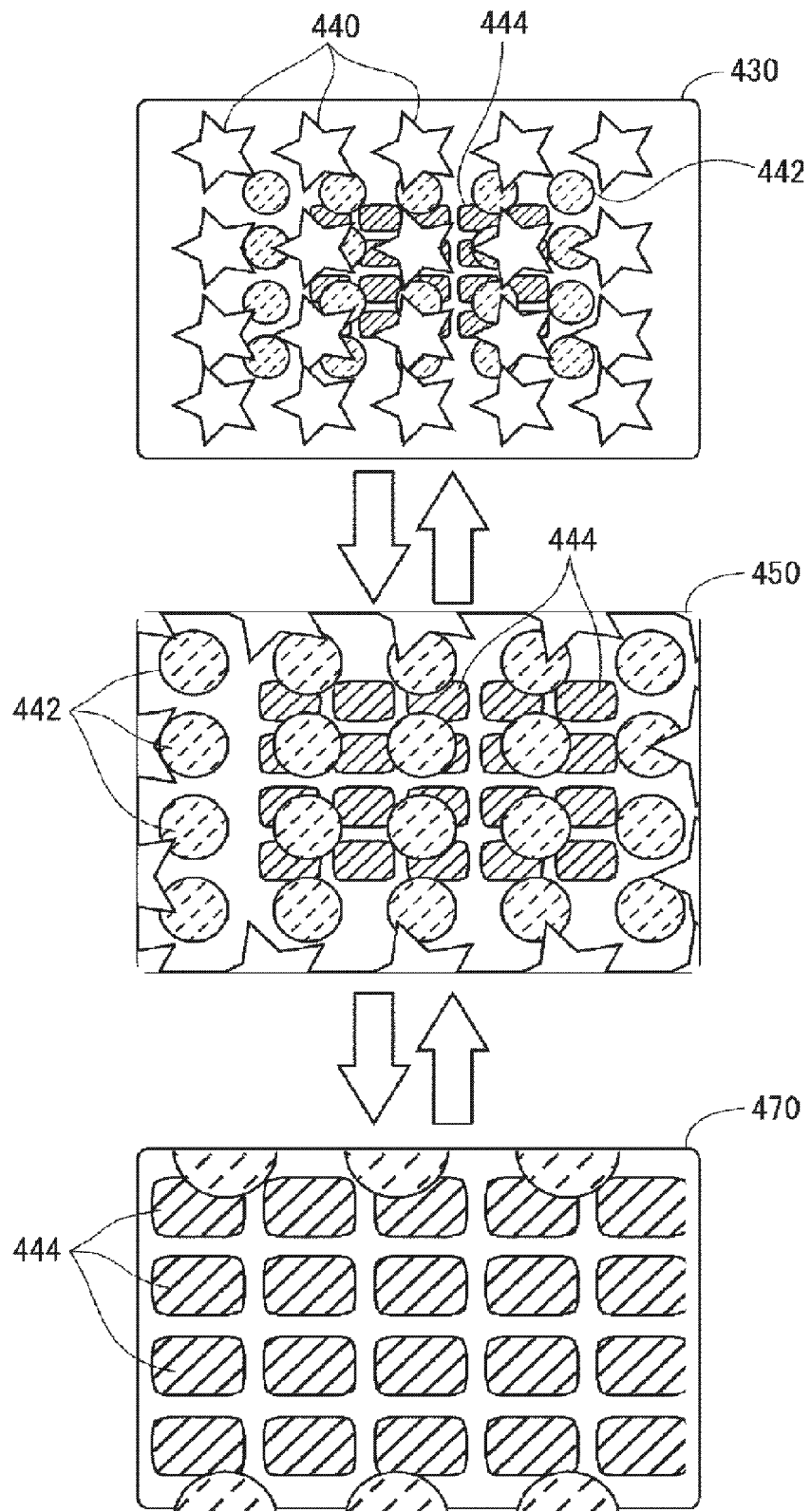
FIG. 21 is a view showing an example of a GUI screen for displaying hierarchically many objects.

For example, referring to FIG. 21, many objects 440, 442 and 444 are displayed on the first screen 430. Among these objects, the objects 440 are arranged on the topmost layer, the objects 442 are arranged on the layer which lies just under the topmost layer, and the objects 444 are arranged on the bottommost layer. Although it is not impossible to select one of the objects 444 arranged on the bottommost layer in the screen, there are the objects which are hidden behind the objects on the upper layer and therefore can not be selected.

The detection of the impact in the direction of Z axis of the casting rod 20 in accordance with the above embodiment can be utilized for solving this problem. That is, when the impact in the direction of Z axis is detected, the control can be performed so that the display moves among the layers arranged three-dimensionally. For example, if the impact in the positive direction of Z axis (in the lower direction) is detected (e.g., other than Z=0b00), the display is changed to move downward by one layer (as shown in the screen 450). That is, when the player performs the casting operation one time with the casting rod 20, the display is changed from the screen 430 to the screen 450.

In the screen 450, the objects of the topmost layer move to the edge area of the screen, and therefore the objects 442 of the second layer are mainly displayed. The objects 444 of the bottommost layer are displayed on the layer which lies just under the second layer. In the condition, the objects 442 of the second layer can be selected easily. Also, the objects 444 of the bottommost layer can be selected more easily than the case of the screen 430. In the case where it is difficult to select the desired one of the objects 444 of the bottommost layer, or view the objects even if this condition, the display is changed to the screen 470 by casting the casting rod 20 only once.

In the screen 470, the objects of the second layer move to the edge area of the screen, and therefore the objects 444 of the bottommost layer are mainly displayed. In the condition, the objects 444 of the bottommost layer can be selected easily.

By the swinging the casting rod 20 up, the display can be returned from the screen 470 to the screen 450, and further to the screen 430. The swing up and the swing down can be distinguished between each other by determining which the acceleration in the direction of the Y axis is negative or positive. While the acceleration in the direction of the Y axis changes from nearly 0 to the positive value at the swing up, the acceleration in the direction of the Y axis changes from the positive value to the negative value at the swing down. The MCU 112 performs this determination and then sends the flag which indicates either the swing up or swing down to the processor 100. Needless to say, the acceleration in the direction of the Y axis is sent to the processor 100, and then the processor may determine.

It is possible to configure the more convenient GUI screen by reflecting the data $Z_A$ which represents the impact in the direction of Z axis detected by two-axis acceleration sensor circuit 118 in such control. The data $Z_A$ has the value in accordance with the velocity when the casting rod 20 is swung down (or up). The value thereof is utilized for determining a hierarchy difference when the up-and-down movement is performed among the layers as described above. For example, it is possible to realize such controls as the display moves by one layer if the data $Z_A$ is within a certain range, the display moves by two layers if the data $Z_A$ is within a larger certain range, and the display moves by three layers if the data $Z_A$ is within a further larger certain range. This example is especially effective when there are the great many objects to be displayed and the many layers to be displayed.

Also, the data Z which represents the impact in the direction of Z axis in incremental steps may be utilized in stead of the data $Z_A$ indicating the impact in the direction of Z axis. For example, it is possible to realize such controls as the display moves by one layer if Z=0b01, the display moves by two layers if Z=0b10, and the display moves by three layers if Z=0b11.

In these interfaces, since it is possible to view not only the objects on the topmost layer as displayed but also the objects on the lower layer, and the further lower layer, it is possible to find easily the desired object among many objects. Further, since the movement among the layers is accomplished by the simple and easy operation, there is the advantage that it is possible to very easily select the desired object from the many objects. Also, in this case, there is no need to display the objects hierarchically. An interface may have such form as to arrange the objects simply three-dimensionally and advance in the space thereof.

Incidentally, while the above three-dimensional interface employs the two-axis acceleration sensor, such three-dimensional interface itself may be realized by using a three-axis acceleration sensor. Also, although it is difficult to configure the above two-dimensional or three-dimensional interface in the case where a one-axis acceleration sensor is employed, for example, in the case where the objects are arranged one-dimensionally and one of them is selected, a user interface can be realized by applying the same scheme as the usage of the two-axis acceleration sensor to a one-axis acceleration sensor.

Further, although the processor 100 and the external memory 102 are incorporated in the cartridge 14 in the above embodiment, these elements may be incorporated in the casting rod 20 and then the casting rod 20 and the television monitor 18 may be connected with each other by the AV cable 16. In this case, there is no need to install the adapter 12, the cartridge 14, and the RF modules 104 and 110. Also, the MCU 112 is omitted, and then the processor 100 may perform the processing which the MCU 112 has performed.

Further, in the above embodiment, when the absolute value of the acceleration in the direction of X axis exceeds the threshold value 1G within the predetermined time period T after it is determined that the absolute value of the acceleration in the direction of Y axis exceeds the threshold value 1G, in response thereto, the impact detection signal Z, which indicates that the impact in the direction of Z axis is detected, is output. That is, the impact detection signal Z is output as a function of the absolute values of the accelerations when these accelerations exceed the threshold value 1G. However, the present invention is not limited to such embodiment. For example, the impact detection signal Z may be output as a function of difference between the absolute value of the acceleration and the threshold value 1G on the condition that the absolute value of the acceleration in the direction of Y axis or the absolute value of the acceleration in the direction of X axis exceed the threshold value 1G.

While the present invention has been described in detail in terms of embodiments, it is apparent that those skilled in the art will recognize that the invention is not limited to the embodiments as explained in this application. The present invention can be practiced with modification and alteration within the spirit and scope of the present invention as defined by the appended any one of claims. Consequently, the description is thus to be regarded as illustrative instead of restrictive on the present invention.

INDUSTRIAL APPLICABILITY

The present invention can be applied to manufacture of a simulated experience apparatus which allows a user to experience simulatively, and a controller thereof, and production of computer software for providing a simulated experience using such simulated experience apparatus and the controller.

The invention claimed is:

1. An impact detector, which utilizes a two-axis acceleration sensor operable to detect an acceleration in a direction of a first axis and an acceleration in a direction of a second axis, for detecting impact in a direction of a third axis different from the direction of the first axis and the direction of the second axis, comprising:
   a first determination unit operable to determine whether or not an absolute value of the acceleration in the direction of the first axis exceeds a predetermined first threshold value which is positive; and
   an impact determination unit operable to output a predetermined impact detection signal which indicates that the impact in the direction of the third axis is detected in response to an absolute value in the direction of the second axis exceeding a predetermined second threshold value which is positive within a predetermined time period after said first determination unit determines that the absolute value of the acceleration in the direction of the first axis exceeds the first threshold value.

2. An impact detector as claimed in claim 1, wherein said impact determination unit includes:
a timing unit operable to start measuring elapsed time in response to determination by said first determination unit that the absolute value of the acceleration in the direction of the first axis exceeds the first threshold value, and stop measuring the elapsed time when the predetermined time period is elapsed;
a second determination unit operable to determine whether or not the absolute value of the acceleration in the direction of the second axis exceeds the second threshold value; and
an impact detection signal output unit operable to output the impact detection signal in response to determination by said second determination unit that the absolute value of the acceleration in the direction of the second axis exceeds the second threshold value during said timing unit measures the elapsed time.

3. An impact detector as claimed in claim 2, further comprising:
a detection time limitation unit operable to limit time for detecting the impact by said first determination unit, said second determination unit and said impact determination unit to a predetermined operation window time.

4. An impact detector as claimed in claim 3, wherein said impact detection signal output unit includes:
a unit operable to output the impact detection signal in response to the determination by said second determination unit that the absolute value of the acceleration in the direction of the second axis exceeds the second threshold value during said timing unit measures the elapsed time within the predetermined operation window time set by said time limitation unit.

5. An impact detector as claimed in claim 2, wherein said impact detection signal output unit includes:
a unit operable to output the impact detection signal as a function of the absolute value of the acceleration in the direction of the first axis when the absolute value of the acceleration in the direction of the first axis exceeds the first threshold value, and the absolute value of the acceleration in the direction of the second axis when the absolute value of the acceleration in the direction of the second axis exceeds the second threshold value during the timing unit measures the elapsed time.

6. An impact detector as claimed in claim 2, wherein said impact detection signal output unit includes:
a unit operable to output the impact detection signal as a function of a maximum value of parts exceeding the first threshold value of the accelerations in the direction of the first axis by time the timing unit stops measuring the elapsed time after the absolute value of the acceleration in the direction of the first axis exceeds the first threshold value, and a maximum value of parts exceeding the second threshold value of the accelerations in the direction of the second axis during the timing unit measures the elapsed time.

7. An impact detector as claimed in claim 1 further comprising:
a control signal generation unit operable to generate one of a plurality of kinds of predetermined control signals in accordance with combination of a value of the acceleration in the direction of the first axis and a value of the acceleration in the direction of the second axis when the absolute value of the acceleration in the direction of the first axis output from said two-axis acceleration sensor is the first threshold value or less and is a predetermined first lower limit value or more, or when the absolute value of the acceleration in the direction of the second axis output from said two-axis acceleration sensor is the second threshold value or less and is a predetermined second lower limit value or more.

8. An impact detector as claimed in claim 7, wherein the first threshold value and the second threshold value are equal to each other.

9. An impact detector as claimed in claim 7, wherein the first lower limit value and the second lower limit value are equal to each other.

10. An impact detector as claimed in claim 7 further comprising:
a unit operable to determine that said impact detector remains stationary when the absolute value of the acceleration in the direction of the first axis output from said two-axis acceleration sensor is less than the first lower limit value and the absolute value of the acceleration in the direction of the second axis output from said two-axis acceleration sensor is less than the second lower limit value.

11. An impact detector as claimed in claim 1 further comprising:
a first control signal generation unit operable to generate one of a plurality of kinds of predetermined first control signals in accordance with a value of the acceleration in the direction of the first axis when the absolute value of the acceleration in the direction of the first axis output from said two-axis acceleration sensor is the first threshold value or less and is a predetermined first lower limit value or more, and when the absolute value of the acceleration in the direction of the second axis output from said two-axis acceleration sensor is less than a predetermined second lower limit value; and
a second control signal generation unit operable to generate one of a plurality of kinds of predetermined second control signals in accordance with a value of the acceleration in the direction of the second axis when the absolute value of the acceleration in the direction of the second axis output from said two-axis acceleration sensor is the second threshold value or less and is the predetermined second lower limit value or more, and when the absolute value of the acceleration in the direction of the first axis output from said two-axis acceleration sensor is less than the predetermined first lower limit value.

12. An impact detector as claimed in claim 11 further comprising:
a third control signal generation unit operable to generate one of a plurality of kinds of predetermined third control signals in accordance with combination of the value of the acceleration in the direction of the first axis and the value of the acceleration in the direction of the second axis when the absolute value of the acceleration in the direction of the first axis output from said two-axis acceleration sensor is the first threshold value or less and is the predetermined first lower limit value or more, and when the absolute value of the acceleration in the direction of the second axis output from said two-axis acceleration sensor is the second threshold value or less and is the predetermined second lower limit value or more.

13. An impact detector as claimed in claim 5, wherein said unit operable to output the impact detection signal includes:
an impact size detection unit operable to output an impact size detection signal which indicates any one of a plurality of steps of predetermined impact sizes in accordance with combination of the absolute value of the acceleration in the direction of the first axis when the absolute value of the acceleration in the direction of the first axis exceeds the first threshold value, and the absolute value of the acceleration in the direction of the second axis when the absolute value of the acceleration in the direction of the second axis exceeds the second threshold value during said timing unit measures the elapsed time.

14. A controller of a simulated experience apparatus for enabling a user to have a predetermined simulated experience, comprising:

a grip member to be gripped by the user;

an impact detector implemented in said grip member and claimed in claim 1; and a sending unit operable to send output of said impact detector to said simulated experience apparatus.

15. A controller as claimed in claim 14, wherein said grip member includes a rod-like member, and wherein said impact detector is implemented in said rod member so that the direction of the first axis coincides with a longitudinal axial direction of said rod-like member.

\* \* \* \* \*